US011057867B2

(12) United States Patent
Liu et al.

(10) Patent No.: US 11,057,867 B2
(45) Date of Patent: *Jul. 6, 2021

(54) SIGNAL TRANSMISSION APPARATUS, SYSTEM, AND METHOD

(71) Applicant: Huawei Technologies Co., Ltd., Shenzhen (CN)

(72) Inventors: Kunpeng Liu, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,249

(22) Filed: Jan. 20, 2020

(65) Prior Publication Data
US 2020/0154406 A1 May 14, 2020

Related U.S. Application Data

(63) Continuation of application No. 15/675,008, filed on Aug. 11, 2017, now Pat. No. 10,555,277, which is a continuation of application No. PCT/CN2015/072928, filed on Feb. 12, 2015.

(51) Int. Cl.
*H04W 72/04* (2009.01)
*H04B 17/309* (2015.01)
*H04B 7/0413* (2017.01)

(52) U.S. Cl.
CPC ........... *H04W 72/04* (2013.01); *H04B 7/0413* (2013.01); *H04B 17/309* (2015.01)

(58) Field of Classification Search
None
See application file for complete search history.

(56) References Cited

U.S. PATENT DOCUMENTS

| 10,555,277 | B2* | 2/2020 | Liu ...................... H04W 72/04 |
| 2004/0203784 | A1 | 10/2004 | Sasaki et al. |
| 2011/0211538 | A1 | 9/2011 | Kakura |
| 2012/0188986 | A1 | 7/2012 | Kawasaki et al. |
| 2013/0010742 | A1 | 1/2013 | Han et al. |
| 2013/0059619 | A1 | 3/2013 | Kim et al. |
| 2013/0064239 | A1 | 3/2013 | Yu et al. |
| 2013/0121185 | A1 | 5/2013 | Li et al. |
| 2013/0230016 | A1 | 9/2013 | Lindoff et al. |
| 2016/0345216 | A1 | 11/2016 | Kishiyama et al. |
| 2018/0352447 | A1 | 12/2018 | He et al. |

FOREIGN PATENT DOCUMENTS

| CN | 101513099 A | 8/2009 |
| CN | 101742518 A | 6/2010 |
| CN | 101772182 A | 7/2010 |
| CN | 101779508 A | 7/2010 |
| EP | 1954084 A1 | 8/2008 |

(Continued)

*Primary Examiner* — Diane L Lo
(74) *Attorney, Agent, or Firm* — Slater Matsil, LLP

(57) ABSTRACT

Embodiments of the present invention provide a signal transmission apparatus, system, and method. A first network device detects, in a first resource group, a first signal sent by a second network device, and the first network device determines an mth resource in a second resource group according to an nth resource in the first resource group and a first correspondence.

24 Claims, 12 Drawing Sheets

A first network device detects, on a first resource group, a first signal sent by a second network device — 100

The first network device determines an mth resource in a second resource group according to an nth resource in the first resource group and a first correspondence — 101

(56) References Cited

FOREIGN PATENT DOCUMENTS

| | | |
|---|---|---|
| EP | 2068571 A1 | 6/2009 |
| EP | 2346290 A1 | 7/2011 |
| EP | 2408247 A1 | 1/2012 |
| EP | 2592771 A2 | 5/2013 |
| EP | 2763489 A1 | 8/2014 |
| JP | 2002300658 A | 10/2002 |
| JP | 2011055443 A | 3/2011 |
| JP | 2014094156 A | 5/2014 |
| JP | 2014527370 A | 10/2014 |
| JP | 2014532320 A | 12/2014 |
| JP | 2015164281 A | 9/2015 |
| JP | 2016535466 A | 11/2016 |
| KR | 20110106789 A | 9/2011 |
| WO | 200163775 A2 | 8/2001 |
| WO | 0215610 A2 | 2/2002 |
| WO | 2014007546 A1 | 1/2014 |
| WO | 2014172306 A2 | 10/2014 |
| WO | 2015147717 A1 | 10/2015 |
| WO | 2016011666 A1 | 1/2016 |

\* cited by examiner

A second network device sends a first signal on a first resource group  —  200

SIGNAL TRANSMISSION APPARATUS, SYSTEM, AND METHOD

CROSS-REFERENCE TO RELATED APPLICATIONS

This application is a continuation of U.S. application Ser. No. 15/675,008, filed on Aug. 11, 2017, which is a continuation of International Application No. PCT/CN2015/072928, filed on Feb. 12, 2015. All of the afore-mentioned patent applications are hereby incorporated by reference in their entireties.

TECHNICAL FIELD

The present invention relates to the field of wireless communications technologies, and in particular, to a signal transmission apparatus, system, and method.

BACKGROUND

A high-frequency technology has started to be used in wireless communication for signal transmission, and a high-frequency characteristic causes a path loss increase. To reduce a path loss, a feasible manner is using massive multiple-input multiple-output (Massive MIMO for short) to form an extremely high antenna gain to compensate for the path loss.

In a current technology, massive MIMO has many antennas, even several hundred antennas. Although a high antenna gain is formed, a beam formed using massive MIMO technology has an extremely narrow width. Therefore, one beam cannot cover all users in a cell.

However, in the current technology, for information such as a broadcast channel and a common channel, an antenna needs to cover all users in a cell. A beam formed by means of massive MIMO cannot cover all users in a cell. Therefore, some users in the cell cannot receive a message such as a broadcast message, and this reduces communication stability.

SUMMARY

Embodiments of the present invention provide a signal transmission apparatus, system, and method, so as to increase communication stability in a massive MIMO scenario.

A first aspect of the embodiments of the present invention provides a network device. The network device includes a detection module, configured to detect, in a first resource group, a first signal sent by a second network device, where the first resource group includes N resources, N is a positive integer greater than 1, and each resource of the first resource group is corresponding to one first signal. The network device also includes a determining module, configured to determine an mth resource in the second resource group according to an nth resource in the first resource group and a first correspondence, where the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N.

With reference to the first aspect, in a first feasible implementation, the determining module is further configured to: before determining the mth resource in the second resource group according to the nth resource in the first resource group and the first correspondence, determine the nth resource in the first resource group according to a first rule.

With reference to the first aspect, in a second feasible implementation, the determining module is specifically configured to: use a detected resource on which energy of the first signal is the strongest in the first resource group, as the nth resource in the first resource group; or use a first resource on which energy of the first signal is greater than a first preset threshold in the first resource group, as the nth resource in the first resource group; or use a first resource on which reference signal received quality (RSRQ) of the first signal is greater than a second preset threshold in the first resource group, as the nth resource in the first resource group; or use a resource on which the first signal is correctly checked by using a cyclic redundancy code (CRC) in the first resource group, as the nth resource in the first resource group.

With reference to the first aspect, in a third feasible implementation, the detection module is further configured to: after the determining module determines the mth resource in the second resource group according to the nth resource in the first resource group and the first correspondence, detect, on the mth resource in the second resource group, a second signal sent by the second network device, where each resource of the second resource group is corresponding to one second signal; and the determining module is further configured to determine a qth resource in a third resource group according to the mth resource in the second resource group and a second correspondence, where the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is 0<q≤Q.

With reference to the first aspect, in a fourth feasible implementation, the determining module is further configured to: before determining the qth resource in the third resource group according to the mth resource in the second resource group and the second correspondence, determine the mth resource in the second resource group according to a second rule.

With reference to the first aspect, in a fifth feasible implementation, the determining module is specifically configured to: use a detected resource on which energy of the second signal is the strongest in the second resource group, as the mth resource in the second resource group; or use a first resource on which energy of the second signal is greater than a third preset threshold in the second resource group, as the mth resource in the second resource group; or use a first resource on which reference signal received quality (RSRQ) of the second signal is greater than a fourth preset threshold in the second resource group, as the mth resource in the second resource group; or use a resource on which the second signal is correctly checked by using a cyclic redundancy code (CRC) in the second resource group, as the mth resource in the second resource group.

With reference to the first aspect, in a sixth feasible implementation, the first signal is at least one of a synchronization channel, a measurement pilot signal, a broadcast channel, a system message, a random access response channel, a radio resource control (RRC) request acknowledgment message, or a downlink data channel; when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

With reference to the first aspect, in a seventh feasible implementation, the detection module is further configured to: after the determining module determines the qth resource in the third resource group according to the mth resource in the second resource group and the second correspondence, detect, on the qth resource in the third resource group, a third signal sent by the second network device, where each resource of the third resource group is corresponding to one third signal; and the determining module is further configured to determine a kth resource in a fourth resource group according to the qth resource in the third resource group and a third correspondence, where the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is $0<k\leq K$.

With reference to the first aspect, in an eighth feasible implementation, the determining module is further configured to: before determining the kth resource in the fourth resource group according to the qth resource in the third resource group and the third correspondence, determine the qth resource in the third resource group according to a third rule.

With reference to the first aspect, in a ninth feasible implementation, the determining module is specifically configured to: use a detected resource on which energy of the third signal is the strongest in the third resource group, as the qth resource in the third resource group; or use a first resource on which energy of the third signal is greater than a fifth preset threshold in the third resource group, as the qth resource in the third resource group; or use a first resource on which reference signal received quality (RSRQ) of the third signal is greater than a sixth preset threshold in the third resource group, as the qth resource in the third resource group; or use a resource on which the third signal is correctly checked by using a cyclic redundancy code (CRC) in the third resource group, as the qth resource in the third resource group.

With reference to the first aspect, in a tenth feasible implementation, the third signal is a broadcast channel.

With reference to the first aspect, in an eleventh feasible implementation, the detection module is further configured to: after the determining module determines the kth resource in the fourth resource group according to the third correspondence, detect the fourth signal on the kth resource in the fourth resource group, where each resource of the fourth resource group is corresponding to one fourth signal; and the determining module is further configured to determine a jth resource in a fifth resource group according to the kth resource in the fourth resource group and a fourth correspondence, where the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\leq J$.

With reference to the first aspect, in a twelfth feasible implementation, the determining module is further configured to: before determining the jth resource in the fifth resource group according to the kth resource in the fourth resource group and the fourth correspondence, determine the kth resource in the fourth resource group according to a fourth rule.

With reference to the first aspect, in a thirteenth feasible implementation, the determining module is specifically configured to: use a detected resource on which energy of the fourth signal is the strongest in the fourth resource group, as the kth resource in the fourth resource group; or use a first resource on which energy of the fourth signal is greater than a seventh preset threshold in the fourth resource group, as the kth resource in the fourth resource group; or use a first resource on which reference signal received quality (RSRQ) of the fourth signal is greater than an eighth preset threshold in the fourth resource group, as the kth resource in the fourth resource group; or use a resource on which the fourth signal is correctly checked by using a cyclic redundancy code (CRC) in the fourth resource group, as the kth resource in the fourth resource group.

With reference to the first aspect, in a fourteenth feasible implementation, the fourth signal is a system message.

With reference to the first aspect, in a fifteenth feasible implementation, the network device further includes: a sending module, configured to: after the determining module determines the jth resource in the fifth resource group according to the kth resource in the fourth resource group and the fourth correspondence, send a fifth signal on the jth resource in the fifth resource group; where the jth resource in the fifth resource group has a fifth correspondence with each of the at least two candidate resources in the sixth resource group, an rth resource in the sixth resource group is one of at least two candidate resources in the sixth resource group, the sixth resource group includes R resources, R is a positive integer greater than 1, and a value range of r is $0<r\leq R$.

With reference to the first aspect, in a sixteenth feasible implementation, the fifth signal is a random access channel.

With reference to the first aspect, in a seventeenth feasible implementation, the detection module is configured to: after the sending module sends the fifth signal on the jth resource in the fifth resource group, detect a sixth signal on the rth resource in the sixth resource group, where each resource of the sixth resource group is corresponding to one sixth signal; and the determining module is further configured to determine a wth resource in a seventh resource group according to the rth resource in the sixth resource group and a sixth correspondence, where the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is 0<w≤W.

With reference to the first aspect, in an eighteenth feasible implementation, the determining module is further configured to: before determining the wth resource in the seventh resource group according to the rth resource in the sixth resource group and the sixth correspondence, determine the rth resource in the sixth resource group according to a sixth rule.

With reference to the first aspect, in a nineteenth feasible implementation, the determining module is specifically configured to: use a detected resource on which energy of the sixth signal is the strongest in the sixth resource group, as the rth resource in the sixth resource group; or use a first resource on which energy of the sixth signal is greater than a ninth preset threshold in the sixth resource group, as the rth resource in the sixth resource group; or use a first resource on which reference signal received quality (RSRQ) of the sixth signal is greater than a tenth preset threshold in the sixth resource group, as the rth resource in the sixth resource group; or use a resource on which the sixth signal is correctly checked by using a cyclic redundancy code (CRC) in the sixth resource group, as the rth resource in the sixth resource group.

With reference to the first aspect, in a twentieth feasible implementation, the sixth signal is a random access response channel.

With reference to the first aspect, in a twenty-first feasible implementation, the sending module is further configured to: after the detection module detects the sixth signal on the rth resource in the sixth resource group, send a seventh signal on the wth resource in the seventh resource group, where the wth resource in the seventh resource group has a seventh correspondence with each of the at least two candidate resources in an eighth resource group, a cth resource in the eighth resource group is one of at least two candidate resources in the eighth resource group, the eighth resource group includes C resources, C is a positive integer greater than 1, and a value range of c is 0<c≤C.

With reference to the first aspect, in a twenty-second feasible implementation, the seventh signal is an RRC request message.

With reference to the first aspect, in a twenty-third feasible implementation, the detection module is further configured to: after the sending module sends the seventh signal on the wth resource in the seventh resource group, detect an eighth signal on the cth resource in the eighth resource group, where each resource of the eighth resource group is corresponding to one eighth signal; and the determining module is further configured to determine an sth resource in a ninth resource group according to the cth resource in the eighth resource group and an eighth correspondence, where the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is 0<s≤S.

With reference to the first aspect, in a twenty-fourth feasible implementation, the determining module is further configured to: before determining the sth resource in the ninth resource group according to the cth resource in the eighth resource group and the eighth correspondence, determine the cth resource in the eighth resource group according to a seventh rule.

With reference to the first aspect, in a twenty-fifth feasible implementation, the determining module is specifically configured to: use a detected resource on which energy of the eighth signal is the strongest in the eighth resource group, as the cth resource in the eighth resource group; or use a first resource on which energy of the eighth signal is greater than the ninth preset threshold in the eighth resource group, as the cth resource in the eighth resource group; or use a first resource on which reference signal received quality (RSRQ) of the eighth signal is greater than the tenth preset threshold in the eighth resource group, as the cth resource in the eighth resource group; or use a resource on which the eighth signal is correctly checked by using a cyclic redundancy code (CRC) in the eighth resource group, as the cth resource in the eighth resource group.

With reference to the first aspect, in a twenty-sixth feasible implementation, the eighth signal is a radio resource control (RRC) request acknowledgment message.

With reference to the first aspect, in a twenty-seventh feasible implementation, the sending module is further configured to: after the detection module detects the eighth signal on the cth resource in the eighth resource group, send a ninth signal on the sth resource in the ninth resource group; or the detection module is further configured to detect a tenth signal on the sth resource in the ninth resource group, where each resource of the ninth resource group is corresponding to one tenth signal.

With reference to the first aspect, in a twenty-eighth feasible implementation, if the detection module detects the tenth signal on the sth resource in the ninth resource group, the determining module is further configured to: before the detection module detects the tenth signal on the sth resource in the ninth resource group, determine the sth resource in the ninth resource group according to an eighth rule.

With reference to the first aspect, in a twenty-ninth feasible implementation, the determining module is specifically configured to: use a detected resource on which energy of the ninth signal is the strongest in the ninth resource group, as the sth resource in the ninth resource group; or use a first resource on which energy of the ninth signal is greater than an eleventh preset threshold in the ninth resource group, as the sth resource in the ninth resource group; or use a first resource on which reference signal received quality (RSRQ) of the ninth signal is greater than a twelfth preset threshold in the ninth resource group, as the sth resource in the ninth resource group; or use a resource on which the ninth signal is correctly checked by using a cyclic redundancy code (CRC) in the ninth resource group, as the sth resource in the ninth resource group.

With reference to the first aspect, in a thirtieth feasible implementation, the ninth signal is an uplink data channel, and the tenth signal is a downlink data channel.

With reference to the first aspect, in a thirty-first feasible implementation, the sending module is further configured to: after the determining module determines the mth resource in the second resource group according to the first correspondence, send an eleventh signal on the mth resource in the second resource group.

With reference to the first aspect, in a thirty-second feasible implementation, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

With reference to the first aspect, in a thirty-third feasible implementation, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

With reference to the first aspect, in a thirty-fourth feasible implementation, if the nth resource in the first resource group is the time domain resource, and the mth resource in the second resource group is the time domain resource, the following formula is met:

$$m=n+x_1;$$

$x_1$ is a first offset, and $x_1$ is greater than or equal to 0; if the qth resource in the third resource group is the time domain resource, the following formula is met:

$$q=m+x_2;$$

$x_2$ is a second offset, and $x_2$ is greater than or equal to 0; if the kth resource in the fourth resource group is the time domain resource, the following formula is met:

$$k=q+x_3;$$

$x_3$ is a third offset, and $x_3$ is greater than or equal to 0; if the jth resource in the fifth resource group is the time domain resource, the following formula is met:

$$j=k+x_4;$$

$x_4$ is a fourth offset, and $x_4$ is greater than or equal to 0; if the rth resource in the sixth resource group is the time domain resource, the following formula is met:

$$r=j+x_5;$$

$x_5$ is a fifth offset, and $x_5$ is greater than or equal to 0;

if the wth resource in the seventh resource group is the time domain resource, the following formula is met:

$$w=r+x_6$$

$x_6$ is a sixth offset, and $x_6$ is greater than or equal to 0; if the cth resource in the eighth resource group is the time domain resource, the following formula is met:

$$c=w+x_7$$

$x_7$ is a seventh offset, and $x_7$ is greater than or equal to 0; and if the sth resource in the ninth resource group is the time domain resource, the following formula is met:

$$s=c+x_8$$

$x_8$ is an eighth offset, and $x_8$ is greater than or equal to 0.

With reference to the first aspect, in a thirty-fifth feasible implementation, the code resource includes any one of the following: a signal sending sequence, a spreading code used by a signal, a scrambling code used by a signal, or a mask added during cyclic redundancy code (CRC) processing.

With reference to the first aspect, in a thirty-sixth feasible implementation, the space resource indicates at least one beam that is used when the second network device sends a signal, or at least one beam that is used when the sending module sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

With reference to the first aspect, in a thirty-seventh feasible implementation, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

A second aspect of the embodiments of the present invention provides a network device. The network device includes a sending module, configured to send a first signal in a first resource group, where the first resource group includes N resources, N is a positive integer greater than 1, and each resource of the first resource group is corresponding to one first signal. An nth resource in the first resource group has a first correspondence with an mth resource in a second resource group, the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is $0<m\le M$, and a value range of n is $0<n\le N$.

With reference to the second aspect, in a first feasible implementation, the sending module is further configured to: after sending the first signal in the first resource group, send a second signal in the second resource group, where each resource of the second resource group is corresponding to one second signal; and the mth resource in the second resource group has a second correspondence with a qth resource in a third resource group, the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is $0<q\le Q$.

With reference to the second aspect, in a second feasible implementation, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

With reference to the second aspect, in a third feasible implementation, the sending module is further configured to: after sending the second signal in the second resource group, send a third signal on the third resource group, where each resource of the third resource group is corresponding to one third signal; and the qth resource in the third resource group has a third correspondence with a kth resource in a fourth resource group, the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is $0<k\leq K$.

With reference to the second aspect, in a fourth feasible implementation, the third signal is a broadcast channel.

With reference to the second aspect, in a fifth feasible implementation, the sending module is further configured to: after sending the third signal on the third resource group, send a fourth signal on the fourth resource group, where each resource of the fourth resource group is corresponding to one fourth signal; and the kth resource in the fourth resource group has a fourth correspondence with a jth resource in a fifth resource group, the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\leq J$.

With reference to the second aspect, in a sixth feasible implementation, the fourth signal is a system message.

With reference to the second aspect, in a seventh feasible implementation, the network device further includes: a detection module, configured to: after the sending module sends the fourth signal on the fourth resource group, detect, on the jth resource in the fifth resource group, a fifth signal sent by the first network device, where each resource of the fifth resource group is corresponding to one fifth signal; and a determining module, configured to determine an rth resource in the sixth resource group according to the jth resource in the fifth resource group and a fifth correspondence, where the sixth resource group includes R resources, R is a positive integer greater than 1, the rth resource in the sixth resource group is one of at least two candidate resources in the sixth resource group, and a value range of r is $0<r\leq R$.

With reference to the second aspect, in an eighth feasible implementation, the fifth signal is a random access channel.

With reference to the second aspect, in a ninth feasible implementation, the sending module is further configured to: after the fifth signal is sent on the jth resource in the fifth resource group, send a sixth signal on the sixth resource group, where each resource of the sixth resource group is corresponding to one sixth signal; and the rth resource in the sixth resource group has a sixth correspondence with a wth resource in a seventh resource group, the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is $0<w\leq W$.

With reference to the second aspect, in a tenth feasible implementation, the sixth signal is a random access response channel.

With reference to the second aspect, in an eleventh feasible implementation, the detection module is further configured to: after the sending module sends the sixth signal on the sixth resource group, detect, on the wth resource in the seventh resource group, a seventh signal sent by the first network device, where each resource of the seventh resource group is corresponding to one seventh signal; and the determining module is further configured to determine a cth resource in the eighth resource group according to the wth resource in the seventh resource group and a seventh correspondence, where the eighth resource group includes C resources, C is a positive integer greater than 1, the cth resource in the eighth resource group is one of at least two candidate resources in the eighth resource group, and a value range of c is $0<c\leq C$.

With reference to the second aspect, in a twelfth feasible implementation, the seventh signal is an RRC request message.

With reference to the second aspect, in a thirteenth feasible implementation, the sending module is further configured to: after the detection module detects, on the wth resource in the seventh resource group, the seventh signal sent by the first network device, send an eighth signal on the cth resource in the eighth resource group, where each resource of the eighth resource group is corresponding to one eighth signal; and the cth resource in the eighth resource group has an eighth correspondence with an sth resource in a ninth resource group, the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is $0<s\leq S$.

With reference to the second aspect, in a fourteenth feasible implementation, the eighth signal is an RRC request acknowledgment message.

With reference to the second aspect, in a fifteenth feasible implementation, the detection module is further configured to: after the sending module sends the eighth signal on the cth resource in the eighth resource group, detect a ninth signal on the sth resource in the ninth resource group; or the sending module is further configured to send a tenth signal on the sth resource in the ninth resource group, where each resource of the ninth resource group is corresponding to one tenth signal.

With reference to the second aspect, in a sixteenth feasible implementation, the ninth signal is an uplink data channel, and the tenth signal is a downlink data channel.

With reference to the second aspect, in a seventeenth feasible implementation, the detection module is further configured to: after the sending module sends the first signal in the first resource group, detect, on the mth resource in the second resource group, an eleventh signal sent by the first network device.

With reference to the second aspect, in an eighteenth feasible implementation, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

With reference to the second aspect, in a nineteenth feasible implementation, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

With reference to the second aspect, in a twentieth feasible implementation, if the nth resource in the first resource group is the time domain resource, and the mth resource in the second resource group is the time domain resource, the following formula is met:

$$m=n+x_1;$$

$x_1$ is a first offset, and $x_1$ is greater than or equal to 0;
if the qth resource in the third resource group is the time domain resource, the following formula is met:

$$q=m+x_2;$$

$x_2$ is a second offset, and $x_2$ is greater than or equal to 0;
if the kth resource in the fourth resource group is the time domain resource, the following formula is met:

$$k=q+x_3;$$

$x_3$ is a third offset, and $x_3$ is greater than or equal to 0;
if the jth resource in the fifth resource group is the time domain resource, the following formula is met:

$$j=k+x_4;$$

$x_4$ is a fourth offset, and $x_4$ is greater than or equal to 0;

if the rth resource in the sixth resource group is the time domain resource, the following formula is met:

$$r=j+x_5$$

$x_5$ is a fifth offset, and $x_5$ is greater than or equal to 0;
if the wth resource in the seventh resource group is the time domain resource, the following formula is met:

$$w=r+x_6$$

$x_6$ is a sixth offset, and $x_6$ is greater than or equal to 0;
if the cth resource in the eighth resource group is the time domain resource, the following formula is met:

$$c=w+x_7$$

$x_7$ is a seventh offset, and $x_7$ is greater than or equal to 0; and
if the sth resource in the ninth resource group is the time domain resource, the following formula is met:

$$s=c+x_8$$

$x_8$ is an eighth offset, and $x_8$ is greater than or equal to 0.

With reference to the second aspect, in a twenty-first feasible implementation, the code resource includes any one of the following: a signal sending sequence, a spreading code used by a signal, a scrambling code used by a signal, or a mask added during cyclic redundancy code (CRC) processing.

With reference to the second aspect, in a twenty-second feasible implementation, the space resource indicates at least one beam that is used when the second network device sends a signal, or at least one beam that is used when the first network device sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

With reference to the second aspect, in a twenty-third feasible implementation, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

A third aspect of the embodiments of the present invention provides a signal transmission system, including at least one network device according to any one of the first aspect and feasible implementations of the first aspect, and at least one network device according to any one of the second aspect and feasible implementations of the second aspect.

A fourth aspect of the embodiments of the present invention provides a signal transmission method. The method includes detecting, by a first network device in a first resource group, a first signal sent by a second network device, where the first resource group includes N resources, N is a positive integer greater than 1, and each resource of the first resource group is corresponding to one first signal. The method also includes determining, by the first network device, an mth resource in the second resource group according to an nth resource in the first resource group and a first correspondence, where the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is $0<m\leq M$, and a value range of n is $0<n\leq N$.

With reference to the fourth aspect, in a first feasible implementation, before the determining, by the first network device, an mth resource in the second resource group according to an nth resource in the first resource group and a first correspondence, the method further includes: determining, by the first network device, the nth resource in the first resource group according to a first rule.

With reference to the fourth aspect, in a second feasible implementation, the determining, by the first network device, the nth resource in the first resource group according to a first rule includes: using, by the first network device, a detected resource on which energy of the first signal is the strongest in the first resource group, as the nth resource in the first resource group; or using, by the first network device, a first resource on which energy of the first signal is greater than a first preset threshold in the first resource group, as the nth resource in the first resource group; or using, by the first network device, a first resource on which reference signal received quality (RSRQ) of the first signal is greater than a second preset threshold in the first resource group, as the nth resource in the first resource group; or using, by the first network device, a resource on which the first signal is correctly checked by using a cyclic redundancy code (CRC) in the first resource group, as the nth resource in the first resource group.

With reference to the fourth aspect, in a third feasible implementation, after the determining, by the first network device, an mth resource in the second resource group according to an nth resource in the first resource group and a first correspondence, the method further includes: detecting, by the first network device on the mth resource in the second resource group, a second signal sent by the second network device, where each resource of the second resource group is corresponding to one second signal; and determining, by the first network device, a qth resource in a third resource group according to the mth resource in the second resource group and a second correspondence, where the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is $0<q\leq Q$.

With reference to the fourth aspect, in a fourth feasible implementation, before the determining, by the first network device, a qth resource in a third resource group according to the mth resource in the second resource group and a second correspondence, the method further includes: determining, by the first network device, the mth resource in the second resource group according to a second rule.

With reference to the fourth aspect, in a fifth feasible implementation, the determining, by the first network device, the mth resource in the second resource group according to a second rule includes: using, by the first network device, a detected resource on which energy of the second signal is the strongest in the second resource group, as the mth resource in the second resource group; or using, by the first network device, a first resource on which energy of the second signal is greater than a third preset threshold in the second resource group, as the mth resource in the second resource group; or using, by the first network device, a first resource on which reference signal received quality (RSRQ) of the second signal is greater than a fourth preset threshold in the second resource group, as the mth resource in the second resource group; or using, by the first network device, a resource on which the second signal is correctly checked by using a cyclic redundancy code (CRC) in the second resource group, as the mth resource in the second resource group.

With reference to the fourth aspect, in a sixth feasible implementation, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

With reference to the fourth aspect, in a seventh feasible implementation, after the determining, by the first network device, a qth resource in a third resource group according to the mth resource in the second resource group and a second correspondence, the method further includes: detecting, by the first network device on the qth resource in the third resource group, a third signal sent by the second network device, where each resource of the third resource group is corresponding to one third signal; and determining, by the first network device, a kth resource in a fourth resource group according to the qth resource in the third resource group and a third correspondence, where the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is $0<k\leq K$.

With reference to the fourth aspect, in an eighth feasible implementation, before the determining, by the first network device, a kth resource in a fourth resource group according to the qth resource in the third resource group and a third correspondence, the method further includes: determining, by the first network device, the qth resource in the third resource group according to a third rule.

With reference to the fourth aspect, in a ninth feasible implementation, the determining, by the first network device, the qth resource in the third resource group according to a third rule includes: using, by the first network device, a detected resource on which energy of the third signal is the strongest in the third resource group, as the qth resource in the third resource group; or using, by the first network device, a first resource on which energy of the third signal is greater than a fifth preset threshold in the third resource group, as the qth resource in the third resource group; or using, by the first network device, a first resource on which reference signal received quality (RSRQ) of the third signal is greater than a sixth preset threshold in the third resource group, as the qth resource in the third resource group; or using, by the first network device, a resource on which the third signal is correctly checked by using a cyclic redundancy code (CRC) in the third resource group, as the qth resource in the third resource group.

With reference to the fourth aspect, in a tenth feasible implementation, the third signal is a broadcast channel.

With reference to the fourth aspect, in an eleventh feasible implementation, after the determining, by the first network device, a kth resource in a fourth resource group according to a third correspondence, the method further includes: detecting, by the first network device, the fourth signal on the kth resource in the fourth resource group, where each resource of the fourth resource group is corresponding to one fourth signal; and determining, by the first network device, a jth resource in a fifth resource group according to the kth resource in the fourth resource group and a fourth correspondence, where the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\le J$.

With reference to the fourth aspect, in a twelfth feasible implementation, before the determining, by the first network device, a jth resource in a fifth resource group according to the kth resource in the fourth resource group and a fourth correspondence, the method further includes: determining, by the first network device, the kth resource in the fourth resource group according to a fourth rule.

With reference to the fourth aspect, in a thirteenth feasible implementation, the determining, by the first network device, the kth resource in the fourth resource group according to a fourth rule includes: using, by the first network device, a detected resource on which energy of the fourth signal is the strongest in the fourth resource group, as the kth resource in the fourth resource group; or using, by the first network device, a first resource on which energy of the fourth signal is greater than a seventh preset threshold in the fourth resource group, as the kth resource in the fourth resource group; or using, by the first network device, a first resource on which reference signal received quality (RSRQ) of the fourth signal is greater than an eighth preset threshold in the fourth resource group, as the kth resource in the fourth resource group; or using, by the first network device, a resource on which the fourth signal is correctly checked by using a cyclic redundancy code (CRC) in the fourth resource group, as the kth resource in the fourth resource group.

With reference to the fourth aspect, in a fourteenth feasible implementation, the fourth signal is a system message.

With reference to the fourth aspect, in a fifteenth feasible implementation, after the determining, by the first network device, a jth resource in a fifth resource group according to the kth resource in the fourth resource group and a fourth correspondence, the method further includes: sending, by the first network device, a fifth signal on the jth resource in the fifth resource group, where the jth resource in the fifth resource group has a fifth correspondence with each of the at least two candidate resources in the sixth resource group, an rth resource in the sixth resource group is one of at least two candidate resources in the sixth resource group, the sixth resource group includes R resources, R is a positive integer greater than 1, and a value range of r is $0<r\le R$.

With reference to the fourth aspect, in a sixteenth feasible implementation, the fifth signal is a random access channel.

With reference to the fourth aspect, in a seventeenth feasible implementation, after the sending, by the first network device, a fifth signal on the jth resource in the fifth resource group, the method further includes: detecting, by the first network device, a sixth signal on the rth resource in the sixth resource group, where each resource of the sixth resource group is corresponding to one sixth signal; and determining, by the first network device, a wth resource in a seventh resource group according to the rth resource in the sixth resource group and a sixth correspondence, where the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is $0\le W\le W$.

With reference to the fourth aspect, in an eighteenth feasible implementation, before the determining, by the first network device, a wth resource in a seventh resource group according to the rth resource in the sixth resource group and a sixth correspondence, the method further includes: determining, by the first network device, the rth resource in the sixth resource group according to a sixth rule.

With reference to the fourth aspect, in a nineteenth feasible implementation, the determining, by the first network device, the rth resource in the sixth resource group according to a sixth rule includes: using, by the first network device, a detected resource on which energy of the sixth signal is the strongest in the sixth resource group, as the rth resource in the sixth resource group; or using, by the first network device, a first resource on which energy of the sixth signal is greater than a ninth preset threshold in the sixth resource group, as the rth resource in the sixth resource group; or using, by the first network device, a first resource on which reference signal received quality (RSRQ) of the sixth signal is greater than a tenth preset threshold in the sixth resource group, as the rth resource in the sixth resource group; or using, by the first network device, a resource on which the sixth signal is correctly checked by using a cyclic redundancy code (CRC) in the sixth resource group, as the rth resource in the sixth resource group.

With reference to the fourth aspect, in a twentieth feasible implementation, the sixth signal is a random access response channel.

With reference to the fourth aspect, in a twenty-first feasible implementation, after the detecting, by the first network device, a sixth signal on the rth resource in the sixth resource group, the method further includes: sending, by the first network device, a seventh signal on the wth resource in the seventh resource group, where the wth resource in the seventh resource group has a seventh correspondence with each of the at least two candidate resources in an eighth resource group, a cth resource in the eighth resource group is one of at least two candidate resources in the eighth resource group, the eighth resource group includes C resources, C is a positive integer greater than 1, and a value range of c is $0<c\le C$.

With reference to the fourth aspect, in a twenty-second feasible implementation, the seventh signal is an RRC request message.

With reference to the fourth aspect, in a twenty-third feasible implementation, after the sending, by the first network device, a seventh signal on the wth resource in the seventh resource group, the method further includes: detecting, by the first network device, an eighth signal on the cth resource in the eighth resource group, where each resource of the eighth resource group is corresponding to one eighth signal; and determining, by the first network device, an sth resource in a ninth resource group according to the cth resource in the eighth resource group and an eighth correspondence, where the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is $0<s\le S$.

With reference to the fourth aspect, in a twenty-fourth feasible implementation, before the determining, by the first network device, an sth resource in a ninth resource group according to the cth resource in the eighth resource group and an eighth correspondence, the method further includes: determining, by the first network device, the cth resource in the eighth resource group according to a seventh rule.

With reference to the fourth aspect, in a twenty-fifth feasible implementation, the determining, by the first network device, the cth resource in the eighth resource group according to a seventh rule includes: using, by the first network device, a detected resource on which energy of the eighth signal is the strongest in the eighth resource group, as the cth resource in the eighth resource group; or using, by the first network device, a first resource on which energy of the eighth signal is greater than the ninth preset threshold in the eighth resource group, as the cth resource in the eighth resource group; or using, by the first network device, a first resource on which reference signal received quality (RSRQ) of the eighth signal is greater than the tenth preset threshold in the eighth resource group, as the cth resource in the eighth resource group; or using, by the first network device, a resource on which the eighth signal is correctly checked by using a cyclic redundancy code (CRC) in the eighth resource group, as the cth resource in the eighth resource group.

With reference to the fourth aspect, in a twenty-sixth feasible implementation, the eighth signal is an RRC request acknowledgment message.

With reference to the fourth aspect, in a twenty-seventh feasible implementation, after the detecting, by the first network device, an eighth signal on the cth resource in the eighth resource group, the method further includes: sending or detecting, by the first network device, a ninth signal or a tenth signal on the sth resource in the ninth resource group, where each resource of the ninth resource group is corresponding to one tenth signal.

With reference to the fourth aspect, in a twenty-eighth feasible implementation, if the first network device detects the tenth signal on the sth resource in the ninth resource group, before the detecting, by the first network device, a tenth signal on the sth resource in the ninth resource group, the method further includes: determining, by the first network device, the sth resource in the ninth resource group according to an eighth rule.

With reference to the fourth aspect, in a twenty-ninth feasible implementation, the determining, by the first network device, the sth resource in the ninth resource group according to an eighth rule includes: using, by the first network device, a detected resource on which energy of the ninth signal is the strongest in the ninth resource group, as the sth resource in the ninth resource group; or using, by the first network device, a first resource on which energy of the ninth signal is greater than an eleventh preset threshold in the ninth resource group, as the sth resource in the ninth resource group; or using, by the first network device, a first resource on which reference signal received quality (RSRQ) of the ninth signal is greater than a twelfth preset threshold in the ninth resource group, as the sth resource in the ninth resource group; or using, by the first network device, a resource on which the ninth signal is correctly checked by using a cyclic redundancy code (CRC) in the ninth resource group, as the sth resource in the ninth resource group.

With reference to the fourth aspect, in a thirtieth feasible implementation, the ninth signal is an uplink data channel, and the tenth signal is a downlink data channel.

With reference to the fourth aspect, in a thirty-first feasible implementation, after the determining, by the first network device, an mth resource in the second resource group according to a first correspondence, the method further includes: sending, by the first network device, an eleventh signal on the mth resource in the second resource group.

With reference to the fourth aspect, in a thirty-second feasible implementation, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

With reference to the fourth aspect, in a thirty-third feasible implementation, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

With reference to the fourth aspect, in a thirty-fourth feasible implementation, if the nth resource in the first resource group is the time domain resource, and the mth resource in the second resource group is the time domain resource, the following formula is met:

$$m = n + x_1;$$

$x_1$ is a first offset, and $x_1$ is greater than or equal to 0;
if the qth resource in the third resource group is the time domain resource, the following formula is met:

$$q = m + x_2;$$

$x_2$ is a second offset, and $x_2$ is greater than or equal to 0;
if the kth resource in the fourth resource group is the time domain resource, the following formula is met:

$$k = q + x_3;$$

$x_3$ is a third offset, and $x_3$ is greater than or equal to 0;

if the jth resource in the fifth resource group is the time domain resource, the following formula is met:

$$j=k+x_4;$$

$x_4$ is a fourth offset, and $x_4$ is greater than or equal to 0;

if the rth resource in the sixth resource group is the time domain resource, the following formula is met:

$$r=j+x_5$$

$x_5$ is a fifth offset, and $x_5$ is greater than or equal to 0;

if the wth resource in the seventh resource group is the time domain resource, the following formula is met:

$$w=r+x_6$$

$x_6$ is a sixth offset, and $x_6$ is greater than or equal to 0;

if the cth resource in the eighth resource group is the time domain resource, the following formula is met:

$$c=w+x_7$$

$x_7$ is a seventh offset, and $x_7$ is greater than or equal to 0; and if the sth resource in the ninth resource group is the time domain resource, the following formula is met:

$$s=c+x_8$$

$x_8$ is an eighth offset, and $x_8$ is greater than or equal to 0.

With reference to the fourth aspect, in a thirty-fifth feasible implementation, the code resource includes any one of the following: a signal sending sequence, a spreading code used by a signal, a scrambling code used by a signal, or a mask added during cyclic redundancy code (CRC) processing.

With reference to the fourth aspect, in a thirty-sixth feasible implementation, the space resource indicates at least one beam that is used when the second network device sends a signal, or at least one beam that is used when the first network device sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

With reference to the fourth aspect, in a thirty-seventh feasible implementation, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

A fifth aspect of the embodiments of the present invention provides a signal transmission method. The method includes sending, by a second network device, a first signal in a first resource group, where the first resource group includes N resources, N is a positive integer greater than 1, and each resource of the first resource group is corresponding to one first signal. The method also includes an nth resource in the first resource group has a first correspondence with an mth resource in a second resource group, the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is $0<m\leq M$, and a value range of n is $0<n\leq N$.

With reference to the fifth aspect, in a first feasible implementation, after the sending, by a second network device, a first signal in a first resource group, the method further includes: sending, by the second network device, a second signal in the second resource group, where each resource of the second resource group is corresponding to one second signal; and the mth resource in the second resource group has a second correspondence with a qth resource in a third resource group, the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is $0<q\leq Q$.

With reference to the fifth aspect, in a second feasible implementation, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

With reference to the fifth aspect, in a third feasible implementation, after the sending, by the second network device, a second signal in the second resource group, the method further includes: sending, by the second network device, a third signal on the third resource group, where each resource of the third resource group is corresponding to one third signal; and the qth resource in the third resource group has a third correspondence with a kth resource in a fourth resource group, the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is $0<k\leq K$.

With reference to the fifth aspect, in a fourth feasible implementation, the third signal is a broadcast channel.

With reference to the fifth aspect, in a fifth feasible implementation, after the sending, by the second network device, a third signal on the third resource group, the method further includes: sending, by the second network device, a fourth signal on the fourth resource group, where each resource of the fourth resource group is corresponding to one fourth signal; and the kth resource in the fourth resource group has a fourth correspondence with a jth resource in a fifth resource group, the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\leq J$.

With reference to the fifth aspect, in a sixth feasible implementation, the fourth signal is a system message.

With reference to the fifth aspect, in a seventh feasible implementation, after the sending, by the second network device, a fourth signal on the fourth resource group, the method further includes: detecting, by the second network device on the jth resource in the fifth resource group, a fifth signal sent by the first network device, where each resource of the fifth resource group is corresponding to one fifth signal; and determining, by the second network device, an rth resource in the sixth resource group according to the jth resource in the fifth resource group and a fifth correspondence, where the sixth resource group includes R resources, R is a positive integer greater than 1, the rth resource in the sixth resource group is one of at least two candidate resources in the sixth resource group, and a value range of r is $0<r\leq R$.

With reference to the fifth aspect, in an eighth feasible implementation, the fifth signal is a random access channel.

With reference to the fifth aspect, in a ninth feasible implementation, after the detecting, by the second network device on the jth resource in the fifth resource group, a fifth signal sent by the first network device, the method further includes: sending, by the second network device, a sixth signal on the sixth resource group, where each resource of the sixth resource group is corresponding to one sixth signal; and the rth resource in the sixth resource group has a sixth correspondence with a wth resource in a seventh resource group, the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is $0<w\leq W$.

With reference to the fifth aspect, in a tenth feasible implementation, the sixth signal is a random access response channel.

With reference to the fifth aspect, in an eleventh feasible implementation, after the sending, by the second network device, a sixth signal on the sixth resource group, the method further includes: detecting, by the second network device on the wth resource in the seventh resource group, a seventh signal sent by the first network device, where each resource of the seventh resource group is corresponding to one seventh signal; and determining, by the second network device, a cth resource in the eighth resource group according to the wth resource in the seventh resource group and a seventh correspondence, where the eighth resource group includes C resources, C is a positive integer greater than 1, the cth resource in the eighth resource group is one of at least two candidate resources in the eighth resource group, and a value range of c is $0<c\leq C$.

With reference to the fifth aspect, in a twelfth feasible implementation, the seventh signal is an RRC request message.

With reference to the fifth aspect, in a thirteenth feasible implementation, after the detecting, by the second network device on the wth resource in the seventh resource group, a seventh signal sent by the first network device, the method further includes: sending, by the second network device, an eighth signal on the cth resource in the eighth resource group, where each resource of the eighth resource group is corresponding to one eighth signal; and the cth resource in the eighth resource group has an eighth correspondence with an sth resource in a ninth resource group, the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is $0<s\leq S$.

With reference to the fifth aspect, in a fourteenth feasible implementation, the eighth signal is an RRC request acknowledgment message.

With reference to the fifth aspect, in a fifteenth feasible implementation, after the sending, by the second network device, an eighth signal on the cth resource in the eighth resource group, the method further includes: detecting, by the second network device, a ninth signal on the sth resource in the ninth resource group; or sending, by the second network device, a tenth signal on the sth resource in the ninth resource group, where each resource of the ninth resource group is corresponding to one tenth signal.

With reference to the fifth aspect, in a sixteenth feasible implementation, the ninth signal is an uplink data channel, and the tenth signal is a downlink data channel.

With reference to the fifth aspect, in a seventeenth feasible implementation, after the sending, by a second network device, a first signal in a first resource group, the method further includes: detecting, by the second network device on the mth resource in the second resource group, an eleventh signal sent by the first network device.

With reference to the fifth aspect, in an eighteenth feasible implementation, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

With reference to the fifth aspect, in a nineteenth feasible implementation, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

With reference to the fifth aspect, in a twentieth feasible implementation, if the nth resource in the first resource group is the time domain resource, and the mth resource in the second resource group is the time domain resource, the following formula is met:

$$m=n+x_1;$$

$x_1$ is a first offset, and $x_1$ is greater than or equal to 0;

if the qth resource in the third resource group is the time domain resource, the following formula is met:

$q=m+x_2;$ $x_2$ is a second offset, and $x_2$ is greater than or equal to 0;
if the kth resource in the fourth resource group is the time domain resource, the following formula is met:

$k=q+x_3;$ $x_3$ is a third offset, and $x_3$ is greater than or equal to 0;
if the jth resource in the fifth resource group is the time domain resource, the following formula is met:

$j=k+x_4;$ $x_4$ is a fourth offset, and $x_4$ is greater than or equal to 0;
if the rth resource in the sixth resource group is the time domain resource, the following formula is met:

$r=j+x_5$ $x_5$ is a fifth offset, and $x_5$ is greater than or equal to 0;
if the wth resource in the seventh resource group is the time domain resource, the following formula is met:

$w=r+x_6$ $x_6$ is a sixth offset, and $x_6$ is greater than or equal to 0;
if the cth resource in the eighth resource group is the time domain resource, the following formula is met:

$c=w+x_7$ $x_7$ is a seventh offset, and $x_7$ is greater than or equal to 0; and
if the sth resource in the ninth resource group is the time domain resource, the following formula is met:

$s=c+x_8$ $x_8$ is an eighth offset, and $x_8$ is greater than or equal to 0.

With reference to the fifth aspect, in a twenty-first feasible implementation, the code resource includes any one of the following: a signal sending sequence, a spreading code used by a signal, a scrambling code used by a signal, or a mask added during cyclic redundancy code (CRC) processing.

With reference to the fifth aspect, in a twenty-second feasible implementation, the space resource indicates at least one beam that is used when the second network device sends a signal, or at least one beam that is used when the first network device sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

With reference to the fifth aspect, in a twenty-third feasible implementation, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

According to the signal transmission apparatus, system, and method provided in the embodiments of the present invention, a first network device detects, in a first resource group, a first signal sent by a second network device. The first resource group includes N resources, N is a positive integer greater than 1, and each resource of the first resource group is corresponding to one first signal. Then, the first network device determines an mth resource in the second resource group according to an nth resource in the first resource group and a first correspondence. The second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N. Therefore, full coverage of a signal (such as a synchronization signal, a system message, or a broadcast message) is ensured in an entire cell in a high-frequency scenario. That is, UE implements interaction with the second network device (access device) by performing detection in the first resource group. Because the first resource group includes multiple resources, on each resource of one resource group, transmission may be performed for different UE. That is, a resource on which different UE detects a signal is different. That is, the UE may determine a correspondence meeting its requirement from correspondences of multiple different resources, and determines the mth resource in the second resource group according to the nth resource in the first resource group. Therefore, the UE does not need to obtain, by means of blind detection on multiple candidate second resources in the second resource group, a second signal sent by the second network device, or send a signal on multiple resources in the second resource group, thereby improving system efficiency and performance.

By comparison, in the current technology, a beam is relatively narrow in a high-frequency scenario and cannot cover an entire cell. Therefore, a resource on which a base station exchanges a synchronization channel, a measurement pilot signal, a broadcast channel, and the like with UE is always the same for all UE within coverage of the base station. That is, all UE in the entire cell detects a synchronization channel, a measurement pilot signal, a broadcast channel, and the like on a same resource. However, when a massive MIMO technology is used, because a formed beam is extremely narrow, a requirement for covering UE in an entire cell by using a same resource cannot be met.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
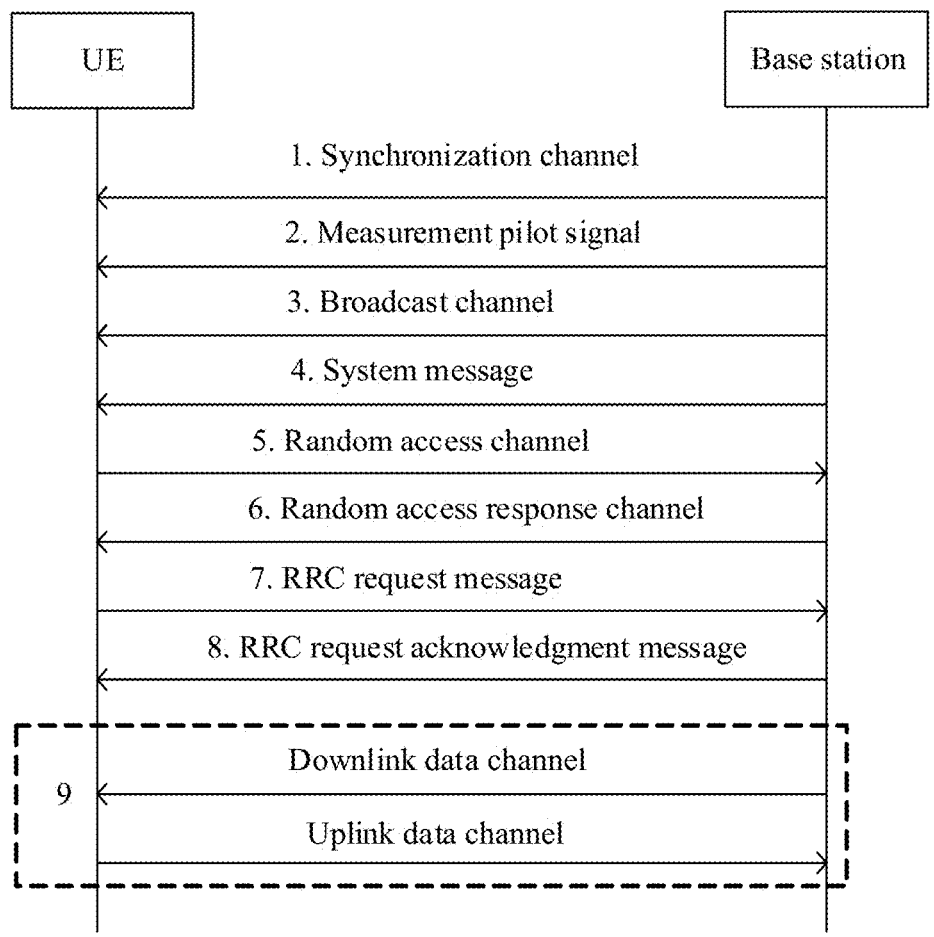
FIG. 1 is a schematic diagram of a process in which user equipment accesses and interacts with a base station according to an embodiment of the present invention.

FIG. 1 is a schematic diagram of an access and interaction process between user equipment and a base station according to an embodiment of the present invention. Referring to FIG. 1, the process includes the following steps.

Step 1: The base station sends a synchronization channel to the user equipment (UE).

Step 2: The base station sends a measurement pilot signal to the UE.

Step 3: The base station sends a broadcast channel to the UE.

Step 4: The base station sends a system message to the UE.

Step 5: The base station receives a random access channel sent by the UE.

Step 6: The base station sends a random access response channel to the UE.

Step 7: The base station receives a radio resource control (RRC) request message sent by the UE.

Step 8: The base station sends an RRC request acknowledgment message to the UE.

Step 9: The base station sends a downlink data channel to the UE, or the base station receives an uplink data channel sent by the UE.

Specifically, in the current technology, a beam is relatively narrow in a high-frequency scenario and cannot cover an entire cell. Therefore, a resource on which a base station exchanges a synchronization channel, a measurement pilot signal, a broadcast channel, and the like with UE is always the same for all UE within coverage of the base station. That is, all UE in the entire cell detects a synchronization channel, a measurement pilot signal, a broadcast channel, and the like on a same resource. However, when a massive MIMO technology is used, because a formed beam is extremely narrow, a requirement for covering UE in an entire cell by using a same resource cannot be met.

To resolve the foregoing problem, the embodiments of the present invention provide a signal transmission apparatus, system, and method, so as to implement coverage for the UE in the entire cell by the foregoing channel and message when the massive MIMO technology is used.

The following describes the signal transmission apparatus, system, and method according to the embodiments of the present invention by using specific embodiments.

Figure 2:
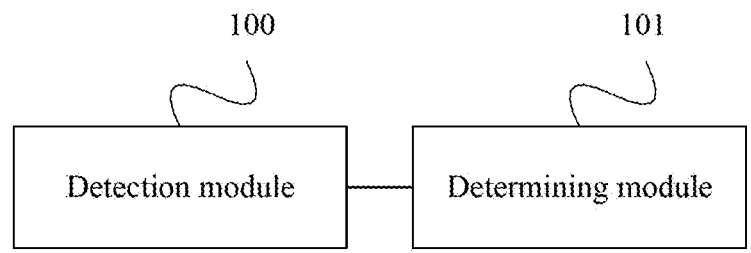
FIG. 2 is a schematic structural diagram of a network device according to an embodiment of the present invention.

FIG. 2 is a schematic structural diagram of a network device according to an embodiment of the present invention. The network device is corresponding to a first network device in the following. The network device may be user equipment (UE). Specifically, the UE may be a smartphone, a tablet computer, a vehicle-in communications device, or the like. Referring to FIG. 2, the network device includes a detection module 100 and a determining module 101.

The detection module 100 is configured to detect, in a first resource group, a first signal sent by a second network device, where the first resource group includes N resources, N is a positive integer greater than 1, and each resource of the first resource group is corresponding to one first signal; and the determining module 101 is configured to determine an mth resource in the second resource group according to an nth resource in the first resource group and a first correspondence, where the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N.

According to the network device provided in this embodiment of the present invention, a detection module detects, in a first resource group, a first signal sent by a second network device. The first resource group includes N resources, N is a positive integer greater than 1, and each resource of the first resource group is corresponding to one first signal. Then, a determining module determines an mth resource in the second resource group according to an nth resource in the first resource group and a first correspondence. The second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N. Therefore, full coverage of a signal (such as a synchronization signal, a system message, or a broadcast message) is ensured in an entire cell in a high-frequency scenario. That is, UE implements interaction with the second network device (access device) by performing detection in the first resource group. Because the first resource group includes multiple resources, on each resource of one resource group, transmission may be performed for different UE. That is, a resource on which different UE detects a signal is different. That is, the UE may determine a correspondence meeting its requirement from correspondences of multiple different resources, and determines the mth resource in the second resource group according to the nth resource in the first resource group. Therefore, the UE does not need to obtain, by means of blind detection on multiple candidate second resources in the second resource group, a second signal sent by the second network device, or send a signal on multiple resources in the second resource group, thereby improving system efficiency and performance.

By comparison, in the current technology, a beam is relatively narrow in a high-frequency scenario and cannot cover an entire cell. Therefore, a resource on which a base station exchanges a synchronization channel, a measurement pilot signal, a broadcast channel, and the like with UE is always the same for all UE within coverage of the base station. That is, all UE in the entire cell detects a synchronization channel, a measurement pilot signal, a broadcast channel, and the like on a same resource. However, when a massive MIMO technology is used, because a formed beam is extremely narrow, a requirement for covering UE in an entire cell by using a same resource cannot be met.

Further, the determining module 101 is further configured to: before determining the mth resource in the second resource group according to the nth resource in the first resource group and the first correspondence, determine the nth resource in the first resource group according to a first rule.

Optionally, the determining module 101 is specifically configured to: use a detected resource on which energy of the first signal is the strongest in the first resource group, as the nth resource in the first resource group; or use a first resource on which energy of the first signal is greater than a first preset threshold in the first resource group, as the nth resource in the first resource group; or use a first resource on which reference signal received quality (RSRQ) of the first signal is greater than a second preset threshold in the first resource group, as the nth resource in the first resource group; or use a resource on which the first signal is correctly checked by using a cyclic redundancy code (CRC) in the first resource group, as the nth resource in the first resource group.

Further, the detection module 100 is further configured to: after the determining module 101 determines the mth resource in the second resource group according to the nth resource in the first resource group and the first correspondence, detect, on the mth resource in the second resource group, a second signal sent by the second network device, where each resource of the second resource group is corresponding to one second signal; and the determining module 101 is further configured to determine a qth resource in a third resource group according to the mth resource in the second resource group and a second correspondence, where the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is $0<q\leq Q$.

Further, the determining module 101 is further configured to: before determining the qth resource in the third resource group according to the mth resource in the second resource group and the second correspondence, determine the mth resource in the second resource group according to a second rule.

Optionally, the determining module 101 is specifically configured to: use a detected resource on which energy of the second signal is the strongest in the second resource group, as the mth resource in the second resource group; or use a first resource on which energy of the second signal is greater than a third preset threshold in the second resource group, as the mth resource in the second resource group; or use a first resource on which reference signal received quality (RSRQ) of the second signal is greater than a fourth preset threshold in the second resource group, as the mth resource in the second resource group; or use a resource on which the second signal is correctly checked by using a cyclic redundancy code (CRC) in the second resource group, as the mth resource in the second resource group.

Optionally, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

Further, the detection module 100 is further configured to: after the determining module 101 determines the qth resource in the third resource group according to the mth resource in the second resource group and the second correspondence, detect, on the qth resource in the third resource group, a third signal sent by the second network device, where each resource of the third resource group is corresponding to one third signal; and the determining module 101 is further configured to determine a kth resource in a fourth resource group according to the qth resource in the third resource group and a third correspondence, where the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is $0<k\leq K$.

Further, the determining module 101 is further configured to: before determining the kth resource in the fourth resource group according to the qth resource in the third resource group and the third correspondence, determine the qth resource in the third resource group according to a third rule.

Optionally, the determining module 101 is specifically configured to: use a detected resource on which energy of the third signal is the strongest in the third resource group, as the qth resource in the third resource group; or use a first resource on which energy of the third signal is greater than a fifth preset threshold in the third resource group, as the qth resource in the third resource group; or use a first resource on which reference signal received quality (RSRQ) of the third signal is greater than a sixth preset threshold in the third resource group, as the qth resource in the third resource group; or use a resource on which the third signal is correctly checked by using a cyclic redundancy code (CRC) in the third resource group, as the qth resource in the third resource group.

Optionally, the third signal is a broadcast channel.

Further, the detection module 100 is further configured to: after the determining module 101 determines the kth resource in the fourth resource group according to the third correspondence, detect the fourth signal on the kth resource in the fourth resource group, where each resource of the fourth resource group is corresponding to one fourth signal; and the determining module 101 is further configured to determine a jth resource in a fifth resource group according to the kth resource in the fourth resource group and a fourth correspondence, where the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\leq J$.

Further, the determining module 101 is further configured to: before determining the jth resource in the fifth resource group according to the kth resource in the fourth resource group and the fourth correspondence, determine the kth resource in the fourth resource group according to a fourth rule.

Optionally, the determining module 101 is specifically configured to: use a detected resource on which energy of the fourth signal is the strongest in the fourth resource group, as the kth resource in the fourth resource group; or use a first resource on which energy of the fourth signal is greater than a seventh preset threshold in the fourth resource group, as the kth resource in the fourth resource group; or use a first resource on which reference signal received quality (RSRQ) of the fourth signal is greater than an eighth preset threshold in the fourth resource group, as the kth resource in the fourth resource group; or use a resource on which the fourth signal is correctly checked by using a cyclic redundancy code (CRC) in the fourth resource group, as the kth resource in the fourth resource group.

Optionally, the fourth signal is a system message.

Figure 3:
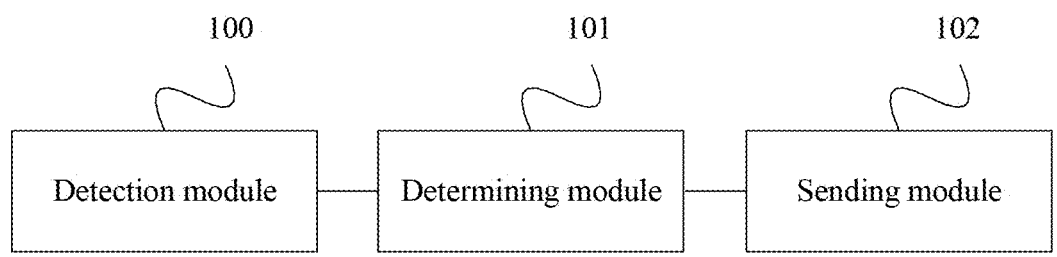
FIG. 3 is a schematic structural diagram of another network device according to an embodiment of the present invention.

Based on FIG. 2, FIG. 3 is a schematic structural diagram of another network device according to an embodiment of the present invention. Referring to FIG. 3, the network device further includes a sending module 102.

The sending module 102 is configured to: after the determining module 101 determines the jth resource in the fifth resource group according to the kth resource in the fourth resource group and the fourth correspondence, send a fifth signal on the jth resource in the fifth resource group; where the jth resource in the fifth resource group has a fifth correspondence with each of the at least two candidate resources in the sixth resource group, an rth resource in the sixth resource group is one of at least two candidate resources in the sixth resource group, the sixth resource group includes R resources, R is a positive integer greater than 1, and a value range of r is $0<r\leq R$.

Optionally, the fifth signal is a random access channel.

Further, the detection module 100 is configured to: after the sending module 102 sends the fifth signal on the jth resource in the fifth resource group, detect a sixth signal on the rth resource in the sixth resource group, where each resource of the sixth resource group is corresponding to one sixth signal; and the determining module 101 is further configured to determine a wth resource in a seventh resource group according to the rth resource in the sixth resource group and a sixth correspondence, where the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is $0<w\leq W$.

Further, the determining module 101 is further configured to: before determining the wth resource in the seventh resource group according to the rth resource in the sixth resource group and the sixth correspondence, determine the rth resource in the sixth resource group according to a sixth rule.

Optionally, the determining module 101 is specifically configured to: use a detected resource on which energy of the sixth signal is the strongest in the sixth resource group, as the rth resource in the sixth resource group; or use a first resource on which energy of the sixth signal is greater than a ninth preset threshold in the sixth resource group, as the rth resource in the sixth resource group; or use a first resource on which reference signal received quality (RSRQ) of the sixth signal is greater than a tenth preset threshold in the sixth resource group, as the rth resource in the sixth resource group; or use a resource on which the sixth signal is correctly checked by using a cyclic redundancy code (CRC) in the sixth resource group, as the rth resource in the sixth resource group.

Optionally, the sixth signal is a random access response channel.

Further, the sending module 102 is further configured to: after the detection module 100 detects the sixth signal on the rth resource in the sixth resource group, send a seventh signal on the wth resource in the seventh resource group, where the wth resource in the seventh resource group has a seventh correspondence with each of the at least two candidate resources in an eighth resource group, a cth resource in the eighth resource group is one of at least two candidate resources in the eighth resource group, the eighth resource group includes C resources, C is a positive integer greater than 1, and a value range of c is $0<c\leq C$.

Optionally, the seventh signal is an RRC request message.

Further, the detection module 100 is further configured to: after the sending module 102 sends the seventh signal on the wth resource in the seventh resource group, detect an eighth signal on the cth resource in the eighth resource group, where each resource of the eighth resource group is corresponding to one eighth signal; and the determining module 101 is further configured to determine an sth resource in a ninth resource group according to the cth resource in the eighth resource group and an eighth correspondence, where the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is $0<s\leq S$.

Further, the determining module 101 is further configured to: before determining the sth resource in the ninth resource group according to the cth resource in the eighth resource group and the eighth correspondence, determine the cth resource in the eighth resource group according to a seventh rule.

Optionally, the determining module 101 is specifically configured to: use a detected resource on which energy of the eighth signal is the strongest in the eighth resource group, as the cth resource in the eighth resource group; or use a first resource on which energy of the eighth signal is greater than the ninth preset threshold in the eighth resource group, as the cth resource in the eighth resource group; or use a first resource on which reference signal received quality (RSRQ) of the eighth signal is greater than the tenth preset threshold in the eighth resource group, as the cth resource in the eighth resource group; or use a resource on which the eighth signal is correctly checked by using a cyclic redundancy code (CRC) in the eighth resource group, as the cth resource in the eighth resource group.

Optionally, the eighth signal is an RRC request acknowledgment message.

Further, the sending module 102 is further configured to: after the detection module 100 detects the eighth signal on the cth resource in the eighth resource group, send a ninth signal on the sth resource in the ninth resource group; or the detection module 100 is further configured to detect a tenth signal on the sth resource in the ninth resource group, where each resource of the ninth resource group is corresponding to one tenth signal.

Further, if the detection module 100 detects the tenth signal on the sth resource in the ninth resource group, the determining module 101 is further configured to: before the detection module 100 detects the tenth signal on the sth resource in the ninth resource group, determine the sth resource in the ninth resource group according to an eighth rule.

Optionally, the determining module 101 is specifically configured to: use a detected resource on which energy of the ninth signal is the strongest in the ninth resource group, as the sth resource in the ninth resource group; or use a first resource on which energy of the ninth signal is greater than an eleventh preset threshold in the ninth resource group, as the sth resource in the ninth resource group; or use a first resource on which reference signal received quality (RSRQ) of the ninth signal is greater than a twelfth preset threshold in the ninth resource group, as the sth resource in the ninth resource group; or use a resource on which the ninth signal is correctly checked by using a cyclic redundancy code (CRC) in the ninth resource group, as the sth resource in the ninth resource group.

Optionally, the ninth signal is an uplink data channel, and the tenth signal is a downlink data channel.

Further, the sending module 102 is further configured to: after the determining module 101 determines the mth resource in the second resource group according to the first correspondence, send an eleventh signal on the mth resource in the second resource group.

Optionally, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

Optionally, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

Optionally, if the nth resource in the first resource group is the time domain resource, and the mth resource in the second resource group is the time domain resource, the following formula is met:

$$m = n + x_1;$$

$x_1$ is a first offset, and $x_1$ is greater than or equal to 0;
if the qth resource in the third resource group is the time domain resource, the following formula is met:

$$q = m + x_2;$$

$x_2$ is a second offset, and $x_2$ is greater than or equal to 0;
if the kth resource in the fourth resource group is the time domain resource, the following formula is met:

$$k = q + x_3;$$

$x_3$ is a third offset, and $x_3$ is greater than or equal to 0;
if the jth resource in the fifth resource group is the time domain resource, the following formula is met:

$$j = k + x_4;$$

$x_4$ is a fourth offset, and $x_4$ is greater than or equal to 0;
if the rth resource in the sixth resource group is the time domain resource, the following formula is met:

$$r = j + x_5$$

$x_5$ is a fifth offset, and $x_5$ is greater than or equal to 0;
if the wth resource in the seventh resource group is the time domain resource, the following formula is met:

$$w = r + x_6$$

$x_6$ is a sixth offset, and $x_6$ is greater than or equal to 0;
if the cth resource in the eighth resource group is the time domain resource, the following formula is met:

$$c = w + x_7$$

$x_7$ is a seventh offset, and $x_7$ is greater than or equal to 0; and
if the sth resource in the ninth resource group is the time domain resource, the following formula is met:

$$s = c + x_8$$

$x_8$ is an eighth offset, and $x_8$ is greater than or equal to 0.

Optionally, the code resource includes any one of the following: a signal sending sequence, a spreading code used by a signal, a scrambling code used by a signal, or a mask added during cyclic redundancy code (CRC) processing.

Optionally, the space resource indicates at least one beam that is used when the second network device sends a signal, or at least one beam that is used when the sending module 102 sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

Optionally, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

Figure 4:
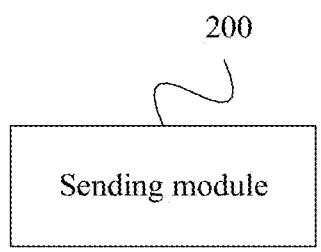
FIG. 4 is a schematic structural diagram of another network device according to an embodiment of the present invention.

FIG. 4 is a schematic structural diagram of another network device according to an embodiment of the present invention. The network device is corresponding to a second network device in the following. The network device may be an access network device. Specifically, the access network device may be a base station, an evolved NodeB, a relay device, or the like. Referring to FIG. 4, the network device includes a sending module 200.

The sending module 200 is configured to send a first signal in a first resource group, where the first resource group includes N resources, N is a positive integer greater than 1, and each resource of the first resource group is corresponding to one first signal; where an nth resource in the first resource group has a first correspondence with an mth resource in a second resource group, the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N.

According to the network device provided in this embodiment of the present invention, a sending module sends a first signal in a first resource group. The first resource group includes N resources, N is a positive integer greater than 1, and each resource of the first resource group is corresponding to one first signal. An nth resource in the first resource group has a first correspondence with an mth resource in a second resource group, the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N. Therefore, full coverage of a signal (such as a synchronization signal, a system message, or a broadcast message) is ensured in an entire cell in a high-frequency scenario. That is, a second network device (access device) sends a first signal to UE in the first resource group. Because the first resource group includes multiple resources, on each resource of one resource group, transmission may be performed for different UE. That is, a resource on which different UE detects a signal is different. That is, the UE may determine a correspondence meeting its requirement from correspondences of multiple different resources, and determines the mth resource in the second resource group according to the nth resource in the first resource group. Therefore, the UE does not need to obtain, by means of blind detection on multiple candidate second resources in the second resource group, a second signal sent by the second network device, or send a signal on multiple resources in the second resource group, thereby improving system efficiency and performance.

By comparison, in the current technology, a beam is relatively narrow in a high-frequency scenario and cannot cover an entire cell. Therefore, a resource on which a base station exchanges a synchronization channel, a measurement pilot signal, a broadcast channel, and the like with UE is always the same for all UE within coverage of the base station. That is, all UE in the entire cell detects a synchronization channel, a measurement pilot signal, a broadcast channel, and the like on a same resource. However, when a massive MIMO technology is used, because a formed beam is extremely narrow, a requirement for covering UE in an entire cell by using a same resource cannot be met.

Further, the sending module 200 is further configured to: after sending the first signal in the first resource group, send a second signal in the second resource group, where each resource of the second resource group is corresponding to one second signal; and the mth resource in the second resource group has a second correspondence with a qth resource in a third resource group, the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is 0<q≤Q.

Optionally, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

Further, the sending module 200 is further configured to: after sending the second signal in the second resource group, send a third signal on the third resource group, where each resource of the third resource group is corresponding to one third signal; and the qth resource in the third resource group has a third correspondence with a kth resource in a fourth resource group, the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is 0<k≤K.

Optionally, the third signal is a broadcast channel.

Further, the sending module 200 is further configured to: after sending the third signal on the third resource group, send a fourth signal on the fourth resource group, where each resource of the fourth resource group is corresponding to one fourth signal; and the kth resource in the fourth resource group has a fourth correspondence with a jth resource in a fifth resource group, the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is 0<j≤J.

Optionally, the fourth signal is a system message.

Figure 5:
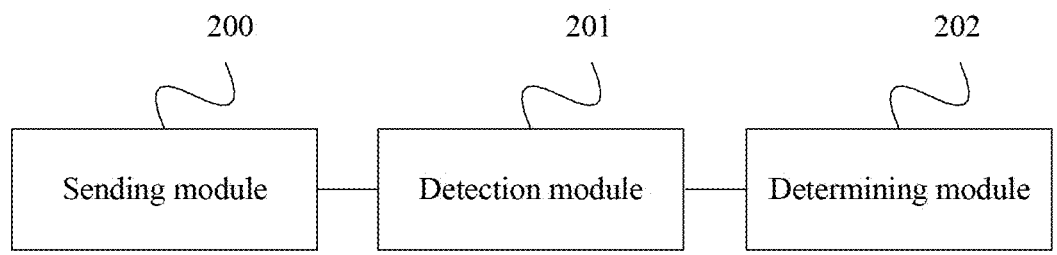
FIG. 5 is a schematic structural diagram of another network device according to an embodiment of the present invention.

Further, based on FIG. 4, FIG. 5 is a schematic structural diagram of another network device according to an embodiment of the present invention. Referring to FIG. 5, the network device further includes a detection module 201 and a determining module 202.

The detection module 201 is configured to: after the sending module 200 sends the fourth signal on the fourth resource group, detect, on the jth resource in the fifth resource group, a fifth signal sent by the first network device, where each resource of the fifth resource group is corresponding to one fifth signal; and the determining module 202 is configured to determine an rth resource in the sixth resource group according to the jth resource in the fifth resource group and a fifth correspondence, where the sixth resource group includes R resources, R is a positive integer greater than 1, the rth resource in the sixth resource group is one of at least two candidate resources in the sixth resource group, and a value range of r is 0<r≤R.

Optionally, the fifth signal is a random access channel.

Further, the sending module 200 is further configured to: after the fifth signal is sent on the jth resource in the fifth resource group, send a sixth signal on the sixth resource group, where each resource of the sixth resource group is corresponding to one sixth signal; and the rth resource in the sixth resource group has a sixth correspondence with a wth resource in a seventh resource group, the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is 0<w≤W.

Optionally, the sixth signal is a random access response channel.

Further, the detection module 201 is further configured to: after the sending module 200 sends the sixth signal on the sixth resource group, detect, on the wth resource in the seventh resource group, a seventh signal sent by the first network device, where each resource of the seventh resource group is corresponding to one seventh signal; and the determining module 202 is further configured to determine a cth resource in the eighth resource group according to the wth resource in the seventh resource group and a seventh correspondence, where the eighth resource group includes C resources, C is a positive integer greater than 1, the cth resource in the eighth resource group is one of at least two candidate resources in the eighth resource group, and a value range of c is 0<c≤C.

Optionally, the seventh signal is an RRC request message.

Further, the sending module 200 is further configured to: after the detection module 201 detects, on the wth resource in the seventh resource group, the seventh signal sent by the first network device, send an eighth signal on the cth resource in the eighth resource group, where each resource of the eighth resource group is corresponding to one eighth signal; and the cth resource in the eighth resource group has an eighth correspondence with an sth resource in a ninth resource group, the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is 0<s≤S.

Optionally, the eighth signal is an RRC request acknowledgment message.

Further, the detection module 201 is further configured to: after the sending module 200 sends the eighth signal on the cth resource in the eighth resource group, detect a ninth signal on the sth resource in the ninth resource group; or the sending module 200 is further configured to send a tenth signal on the sth resource in the ninth resource group, where each resource of the ninth resource group is corresponding to one tenth signal.

Optionally, the ninth signal is an uplink data channel, and the tenth signal is a downlink data channel.

Further, the detection module 201 is further configured to: after the sending module 200 sends the first signal in the first resource group, detect, on the mth resource in the second resource group, an eleventh signal sent by the first network device.

Optionally, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

Optionally, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

Optionally, if the nth resource in the first resource group is the time domain resource, and the mth resource in the second resource group is the time domain resource, the following formula is met:

$$m = n + x_1;$$

$x_1$ is a first offset, and $x_1$ is greater than or equal to 0;

if the qth resource in the third resource group is the time domain resource, the following formula is met:

$$q = m + x_2;$$

$x_2$ is a second offset, and $x_2$ is greater than or equal to 0;

if the kth resource in the fourth resource group is the time domain resource, the following formula is met:

$$k = q + x_3;$$

$x_3$ is a third offset, and $x_3$ is greater than or equal to 0;

if the jth resource in the fifth resource group is the time domain resource, the following formula is met:

$j = k + x_4;$ $x_4$ is a fourth offset, and $x_4$ is greater than or equal to 0;

if the rth resource in the sixth resource group is the time domain resource, the following formula is met:

$r = j + x_5$ $x_5$ is a fifth offset, and $x_5$ is greater than or equal to 0;

if the wth resource in the seventh resource group is the time domain resource, the following formula is met:

$w = r + x_6$ $x_6$ is a sixth offset, and $x_6$ is greater than or equal to 0;

if the cth resource in the eighth resource group is the time domain resource, the following formula is met:

$c = w + x_7$ $x_7$ is a seventh offset, and $x_7$ is greater than or equal to 0; and if the sth resource in the ninth resource group is the time domain resource, the following formula is met:

$s = c + x_8$ $x_8$ is an eighth offset, and $x_8$ is greater than or equal to 0.

Optionally, the code resource includes any one of the following: a signal sending sequence, a spreading code used by a signal, a scrambling code used by a signal, or a mask added during cyclic redundancy code (CRC) processing.

Optionally, the space resource indicates at least one beam that is used when the second network device sends a signal, or at least one beam that is used when the first network device sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

Optionally, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

Figure 6:
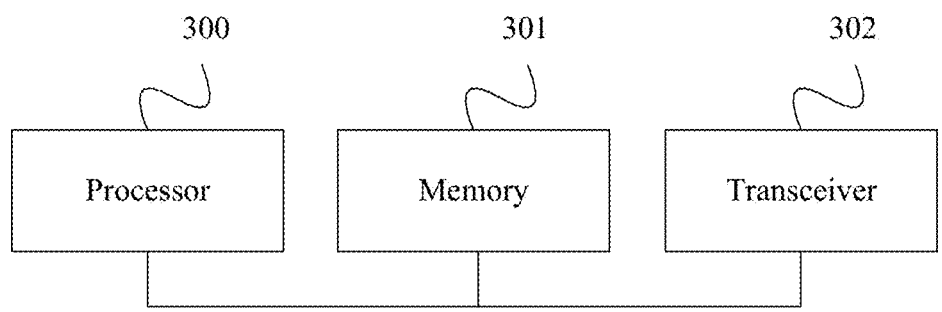
FIG. 6 is a schematic structural diagram of a general-purpose network device according to an embodiment of the present invention.

Further, FIG. 6 is a schematic structural diagram of a general-purpose network device according to an embodiment of the present invention. Referring to FIG. 6, the general-purpose network device includes a processor 300, a memory 301, and a transceiver 302.

Both the foregoing network device used as UE and the foregoing network device used as an access device may use the structure of the general-purpose network device shown in FIG. 6.

Correspondingly, when the UE uses the structure of the general-purpose network device shown in FIG. 6, the memory 301 is configured to store a parameter, a program, and data that are related to the embodiment corresponding to FIG. 2 and FIG. 3. The processor 300 is configured to invoke the parameter, the program, and the data that are stored in the memory 301, to implement corresponding functions of the detection module 100 and the determining module 101. The transceiver 302 can adapt to corresponding requirements of high-frequency sending/receiving in a MIMO scenario, to implement a corresponding function of the sending module 102, so as to implement technical effects of the embodiment corresponding to FIG. 2 and FIG. 3.

Correspondingly, when the access network device uses the structure of the general-purpose network device shown in FIG. 6, the memory 301 is configured to store a parameter, a program, and data that are related to the embodiment corresponding to FIG. 4 and FIG. 5. The processor 300 is configured to invoke the parameter, the program, and the data that are stored in the memory 301, to implement corresponding functions of the detection module 201 and the determining module 202. The transceiver 302 can adapt to corresponding requirements of high-frequency sending/receiving in a MIMO scenario, to implement a corresponding function of the sending module 200, so as to implement technical effects of the embodiment corresponding to FIG. 4 and FIG. 5.

An embodiment of the present invention further provides a signal transmission system. The system includes a first network device that uses the structure shown in FIG. 2, FIG. 3, or FIG. 6, and a second network device that uses the structure shown in FIG. 4, FIG. 5, or FIG. 6. The system can implement functions of the embodiment corresponding to FIG. 2, FIG. 3, FIG. 4, FIG. 5, or FIG. 6 and implement corresponding technical effects.

Figure 7:
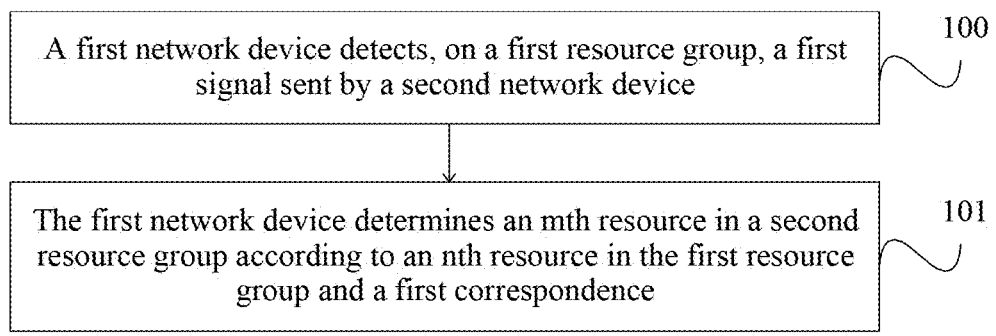
FIG. 7 is a schematic flowchart of a signal transmission method according to an embodiment of the present invention.

FIG. 7 is a schematic flowchart of a signal transmission method according to an embodiment of the present invention. The method is executed by a first network device, and the first network device is user equipment UE and may be specifically a smartphone, a tablet computer, a vehicle-in communications device, or the like. Referring to FIG. 7, the method includes the following steps.

Step 100: The first network device detects, in a first resource group, a first signal sent by a second network device, where the first resource group includes N resources, N is a positive integer greater than 1, and each resource of the first resource group is corresponding to one first signal.

Step 101: The first network device determines an mth resource in the second resource group according to an nth resource in the first resource group and a first correspondence.

The second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N.

According to the signal transmission method provided in this embodiment of the present invention, a first network device detects, in a first resource group, a first signal sent by a second network device. The first resource group includes N resources, N is a positive integer greater than 1, and each resource of the first resource group is corresponding to one first signal. Then, the first network device determines an mth resource in the second resource group according to an nth resource in the first resource group and a first correspondence. The second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N. Therefore, full coverage of a signal (such as a synchronization signal, a system message, or a broadcast message) is ensured in an entire cell in a high-frequency scenario. That is, UE implements interaction with the second network device (access device) by performing detection in the first resource group. Because the first resource group includes multiple resources, on each resource of one resource group, transmission may be performed for different UE. That is, a resource on which different UE detects a signal is different. That is, the UE may determine a correspondence meeting its requirement from correspondences of multiple different resources, and determines the mth resource in the second resource group according to the nth resource in the first resource group. Therefore, the UE does not need to obtain, by means of blind detection on multiple candidate second resources in the second resource group, a second signal sent by the second network device, or send a signal on multiple resources in the second resource group, thereby improving system efficiency and performance.

By comparison, in the current technology, a beam is relatively narrow in a high-frequency scenario and cannot cover an entire cell. Therefore, a resource on which a base station exchanges a synchronization channel, a measurement pilot signal, a broadcast channel, and the like with UE is always the same for all UE within coverage of the base station. That is, all UE in the entire cell detects a synchronization channel, a measurement pilot signal, a broadcast channel, and the like on a same resource. However, when a massive MIMO technology is used, because a formed beam is extremely narrow, a requirement for covering UE in an entire cell by using a same resource cannot be met.

Optionally, the first resource group is used as an example. Different resources in the first resource group may be in a time division manner and have a same cycle. For example, a cycle of the first resource in the first resource group is: t0, t0+T, t0+2T, . . . ; a cycle of the second resource in the first resource group is: t1, t1+T, t1+2T, . . . , where t0 and t1 are indexes of a time unit, the time unit may be a symbol, a timeslot, or a subframe, and T is a cycle. Further, resource groups in the following may have a similar attribute, and details are not described herein.

Further, before step 101, the method further includes the following steps.

Step 102: The first network device determines the nth resource in the first resource group according to a first rule.

It should be noted that step 102 is not shown in the figure, and a similar step is also not shown in the figure in the following and is described only in the embodiment.

Specifically, step 102 may include the following feasible implementations.

Manner 1: The first network device uses a detected resource on which energy of the first signal is the strongest in the first resource group, as the nth resource in the first resource group; or manner 2: the first network device uses a first resource on which energy of the first signal is greater than a first preset threshold in the first resource group, as the nth resource in the first resource group; or manner 3: the first network device uses a first resource on which reference signal received quality (RSRQ) of the first signal is greater than a second preset threshold in the first resource group, as the nth resource in the first resource group; or manner 4: the first network device uses a resource on which the first signal is correctly checked by using a cyclic redundancy code (CRC) in the first resource group, as the nth resource in the first resource group.

Figure 8A:
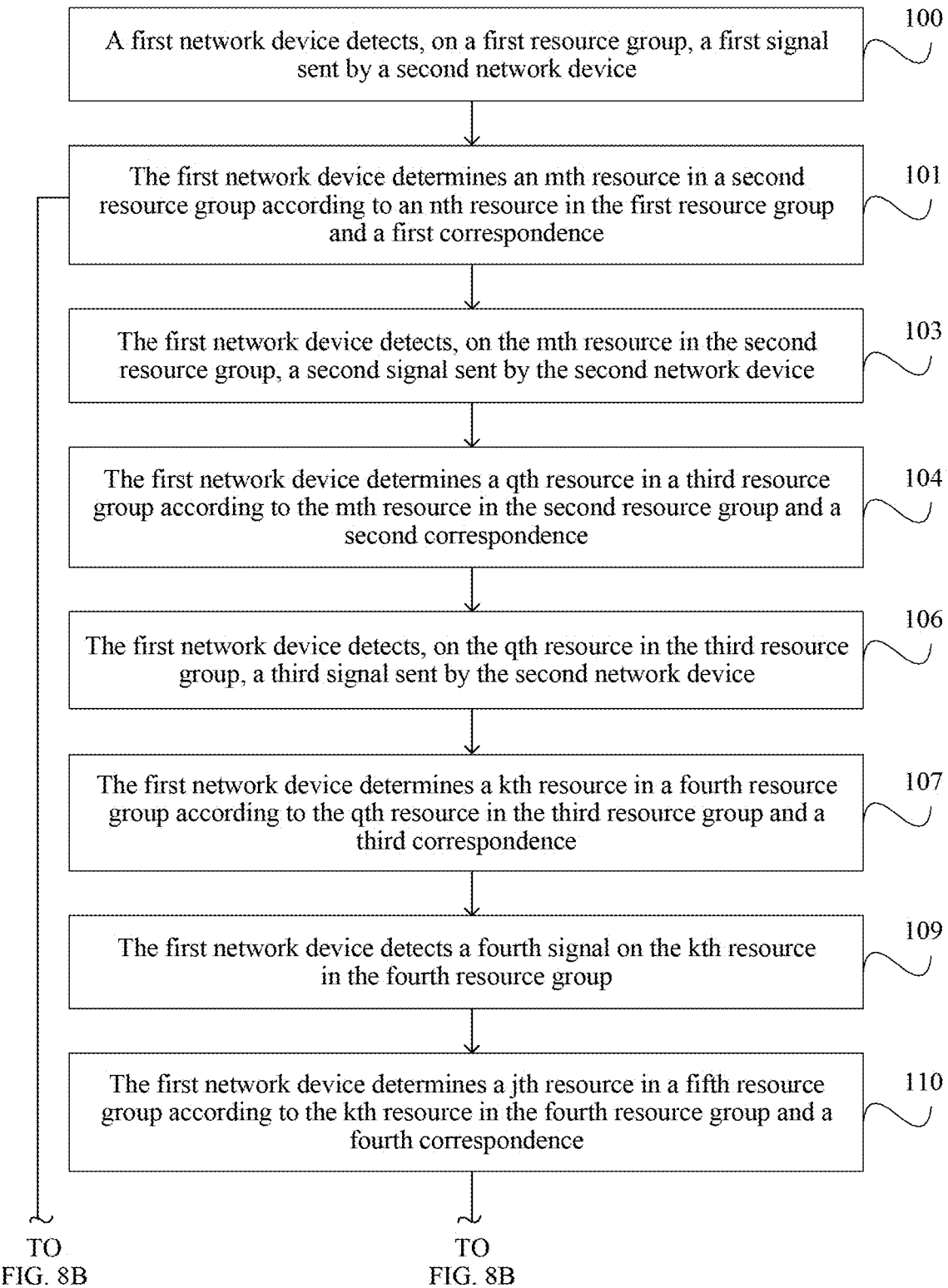
FIG. 8A and FIG. 8B are a schematic flowchart of another signal transmission method according to an embodiment of the present invention.
Figure 8B:
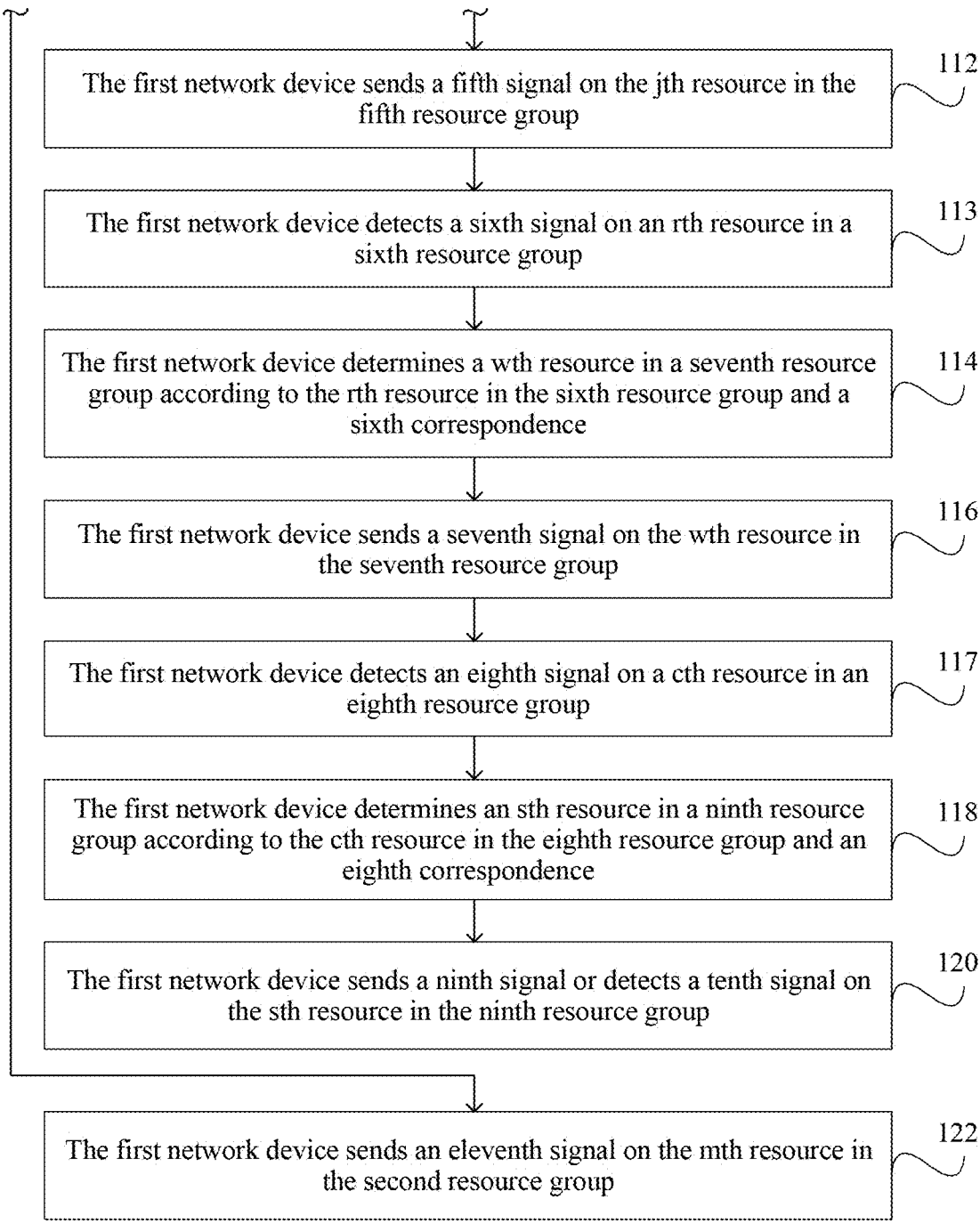

Further, based on FIG. 7, FIG. 8A and FIG. 8B are a schematic flowchart of another signal transmission method according to an embodiment of the present invention. Referring to FIG. 8A and FIG. 8B, after step 101, the method further includes the following steps.

Step 103: The first network device detects, on the mth resource in the second resource group, a second signal sent by the second network device, where each resource of the second resource group is corresponding to one second signal.

Step 104: The first network device determines a qth resource in a third resource group according to the mth resource in the second resource group and a second correspondence, where the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is 0<q≤Q.

Optionally, before step 104, the method further includes the following steps.

Step 105: The first network device determines the mth resource in the second resource group according to a second rule.

Specifically, step 105 may include the following feasible implementations.

Manner 1: The first network device uses a detected resource on which energy of the second signal is the strongest in the second resource group, as the mth resource in the second resource group; or manner 2: the first network device uses a first resource on which energy of the second signal is greater than a third preset threshold in the second resource group, as the mth resource in the second resource group; or manner 3: the first network device uses a first resource on which reference signal received quality (RSRQ) of the second signal is greater than a fourth preset threshold in the second resource group, as the mth resource in the second resource group; or manner 4: the first network device uses a resource on which the second signal is correctly checked by using a cyclic redundancy code (CRC) in the second resource group, as the mth resource in the second resource group.

Optionally, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

Further referring to FIG. 8A and FIG. 8B, after step 104, the method further includes the following steps.

Step 106: The first network device detects, on the qth resource in the third resource group, a third signal sent by the second network device, where each resource of the third resource group is corresponding to one third signal.

Step 107: The first network device determines a kth resource in a fourth resource group according to the qth resource in the third resource group and a third correspondence.

The fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is 0<k≤K.

Optionally, before step 107, the method further includes the following steps.

Step 108: The first network device determines the qth resource in the third resource group according to a third rule.

Specifically, step 108 may include the following feasible implementations.

Manner 1: The first network device uses a detected resource on which energy of the third signal is the strongest in the third resource group, as the qth resource in the third resource group; or manner 2: the first network device uses a first resource on which energy of the third signal is greater than a fifth preset threshold in the third resource group, as the qth resource in the third resource group; or manner 3: the first network device uses a first resource on which reference signal received quality (RSRQ) of the third signal is greater than a sixth preset threshold in the third resource group, as the qth resource in the third resource group; or manner 4: the first network device uses a resource on which the third signal is correctly checked by using a cyclic redundancy code (CRC) in the third resource group, as the qth resource in the third resource group.

Optionally, the third signal is a broadcast channel.

Further referring to FIG. 8A and FIG. 8B, after step 107, the method further includes the following steps.

Step 109: The first network device detects the fourth signal on the kth resource in the fourth resource group, where each resource of the fourth resource group is corresponding to one fourth signal.

Step 110: The first network device determines a jth resource in a fifth resource group according to the kth resource in the fourth resource group and a fourth correspondence.

The fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\leq J$.

Optionally, before step 110, the method further includes the following steps.

Step 111: The first network device determines the kth resource in the fourth resource group according to a fourth rule.

Specifically, step 111 may include the following feasible implementations.

Manner 1: The first network device uses a detected resource on which energy of the fourth signal is the strongest in the fourth resource group, as the kth resource in the fourth resource group; or manner 2: the first network device uses a first resource on which energy of the fourth signal is greater than a seventh preset threshold in the fourth resource group, as the kth resource in the fourth resource group; or manner 3: the first network device uses a first resource on which reference signal received quality (RSRQ) of the fourth signal is greater than an eighth preset threshold in the fourth resource group, as the kth resource in the fourth resource group; or manner 4: the first network device uses a resource on which the fourth signal is correctly checked by using a cyclic redundancy code (CRC) in the fourth resource group, as the kth resource in the fourth resource group.

Optionally, the fourth signal is a system message.

Further, referring to FIG. 8A and FIG. 8B, after step 11o, the method further includes the following steps.

Step 112: The first network device sends a fifth signal on the jth resource in the fifth resource group.

The jth resource in the fifth resource group has a fifth correspondence with each of the at least two candidate resources in the sixth resource group, an rth resource in the sixth resource group is one of at least two candidate resources in the sixth resource group, the sixth resource group includes R resources, R is a positive integer greater than 1, and a value range of r is $0<r\leq R$.

Optionally, the fifth signal is a random access channel.

Further, referring to FIG. 8A and FIG. 8B, after step 112, the method further includes:

Step 113: The first network device detects a sixth signal on the rth resource in the sixth resource group, where each resource of the sixth resource group is corresponding to one sixth signal.

Step 114: The first network device determines a wth resource in a seventh resource group according to the rth resource in the sixth resource group and a sixth correspondence.

The seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is $0<w\leq W$.

Optionally, before step 114, the method further includes:

Step 115: The first network device determines the rth resource in the sixth resource group according to a sixth rule.

Specifically, step 115 may include the following feasible implementations.

Manner 1: The first network device uses a detected resource on which energy of the sixth signal is the strongest in the sixth resource group, as the rth resource in the sixth resource group; or manner 2: the first network device uses a first resource on which energy of the sixth signal is greater than a ninth preset threshold in the sixth resource group, as the rth resource in the sixth resource group; or manner 3: the first network device uses a first resource on which reference signal received quality (RSRQ) of the sixth signal is greater than a tenth preset threshold in the sixth resource group, as the rth resource in the sixth resource group; or manner 4: the first network device uses a resource on which the sixth signal is correctly checked by using a cyclic redundancy code (CRC) in the sixth resource group, as the rth resource in the sixth resource group.

Optionally, the sixth signal is a random access response channel.

Further, referring to FIG. 8A and FIG. 8B, after step 114, the method further includes the following.

Step 116: The first network device sends a seventh signal on the wth resource in the seventh resource group.

The wth resource in the seventh resource group has a seventh correspondence with each of the at least two candidate resources in an eighth resource group, a cth resource in the eighth resource group is one of at least two candidate resources in the eighth resource group, the eighth resource group includes C resources, C is a positive integer greater than 1, and a value range of c is $0<c\leq C$.

Optionally, the seventh signal is an RRC request message.

Further, referring to FIG. 8A and FIG. 8B, after step 116, the method further includes the following.

Step 117: The first network device detects an eighth signal on the cth resource in the eighth resource group, where each resource of the eighth resource group is corresponding to one eighth signal.

Step 118: The first network device determines an sth resource in a ninth resource group according to the cth resource in the eighth resource group and an eighth correspondence.

The ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is 0<s≤S.

Optionally, before step 118, the method further includes the following.

Step 119: The first network device determines the cth resource in the eighth resource group according to a seventh rule.

Specifically, step 119 may include the following feasible implementations.

Manner 1: The first network device uses a detected resource on which energy of the eighth signal is the strongest in the eighth resource group, as the cth resource in the eighth resource group; or manner 2: the first network device uses a first resource on which energy of the eighth signal is greater than the ninth preset threshold in the eighth resource group, as the cth resource in the eighth resource group; or manner 3: the first network device uses a first resource on which reference signal received quality (RSRQ) of the eighth signal is greater than the tenth preset threshold in the eighth resource group, as the cth resource in the eighth resource group; or manner 4: the first network device uses a resource on which the eighth signal is correctly checked by using a cyclic redundancy code (CRC) in the eighth resource group, as the cth resource in the eighth resource group.

Optionally, the eighth signal is an RRC request acknowledgment message.

Further, referring to FIG. 8A and FIG. 8B, after step 118, the method further includes:

Step 120: The first network device sends a ninth signal or detects a tenth signal on the sth resource in the ninth resource group.

Each resource of the ninth resource group is corresponding to one tenth signal.

Optionally, if the first network device detects the tenth signal on the sth resource in the ninth resource group, before step 120, the method further includes the following.

Step 121: The first network device determines the sth resource in the ninth resource group according to an eighth rule.

Specifically, step 121 may include the following feasible implementations.

Manner 1: The first network device uses a detected resource on which energy of the ninth signal is the strongest in the ninth resource group, as the sth resource in the ninth resource group; or manner 2: the first network device uses a first resource on which energy of the ninth signal is greater than an eleventh preset threshold in the ninth resource group, as the sth resource in the ninth resource group; or manner 3: the first network device uses a first resource on which reference signal received quality (RSRQ) of the ninth signal is greater than a twelfth preset threshold in the ninth resource group, as the sth resource in the ninth resource group; or manner 4: the first network device uses a resource on which the ninth signal is correctly checked by using a cyclic redundancy code (CRC) in the ninth resource group, as the sth resource in the ninth resource group.

Optionally, the ninth signal is an uplink data channel, and the tenth signal is a downlink data channel.

Optionally, further referring to FIG. 8A and FIG. 8B, after step 101, the method further includes the following.

Step 122: The first network device sends an eleventh signal on the mth resource in the second resource group.

Further, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

For the foregoing embodiment, the N resources in the first resource group are any one type of the following resources: a time domain resource, a frequency domain resource, a code resource, a space resource, or a power resource.

Specifically, for the time domain resource, the first signal is used as an example; the second network device may send the first signal on multiple time domain resources. The multiple time domain resources form the foregoing first resource group, and each time domain resource may have a correspondence with one or more resources of the second resource group.

The frequency domain resource is similar to the time domain resource and has different physical resource blocks (PRBs) or subbands.

The code resource includes any one of the following: a signal sending sequence, a spreading code used by a signal, a scrambling code used by a signal, or a mask added during cyclic redundancy code (CRC) processing.

Further, if a resource group is a code resource, and a sequence identifier of a resource in the resource group is ID1, correspondingly, the sequence identifier has a correspondence with a resource in a next resource group. For example, the next resource group is a time domain resource. Then, the sequence identifier is corresponding to a resource t1 in the next resource group. For example, if the next resource group is a frequency domain resource, the sequence identifier is corresponding to a resource f1 in the next resource group. For example, if the next resource group is a time frequency resource, the sequence identifier is corresponding to a resource (t1, f1) in the next resource group.

Similarly, for example, if the sequence identifier is ID2, a corresponding time frequency resource is (t2, f2).

A synchronization channel includes a primary synchronization signal PSS and a secondary synchronization signal SSS. The PSS may be generated by using the following formula and table. It is assumed that one sector supports 12 beams, and one base station is divided into three sectors. The PSS needs to support 3*12=36 beams, and correspondingly 36 code resources are required. For example, $N_{ID1}$ 0 to 35 in the table represent 36 code resources in total.

$$d_u(n) = \begin{cases} e^{-j\frac{\pi u n(n+1)}{67}} & n = 0, 1, \ldots, 30 \\ e^{-j\frac{\pi u(n+1)(n+2)}{67}} & n = 31, 32, \ldots, 61 \end{cases}$$

| $N_{ID1}$ | Root sequence u |
|---|---|
| 0 | 0 |
| 1 | 1 |
| 2 | 2 |
| 3 | 4 |
| 4 | 6 |
| 5 | 8 |
| 6 | 10 |

-continued

| $N_{ID1}$ | Root sequence u |
|---|---|
| 7 | 12 |
| 8 | 14 |
| 9 | 16 |
| 10 | 18 |
| 11 | 20 |
| 12 | 22 |
| 13 | 24 |
| 14 | 26 |
| 15 | 28 |
| 16 | 30 |
| 17 | 32 |
| 18 | 33 |
| 19 | 35 |
| 20 | 36 |
| 21 | 38 |
| 22 | 40 |
| 23 | 42 |
| 24 | 44 |
| 25 | 46 |
| 26 | 48 |
| 27 | 50 |
| 28 | 52 |
| 29 | 54 |
| 30 | 56 |
| 31 | 58 |
| 32 | 60 |
| 33 | 62 |
| 34 | 64 |
| 35 | 66 |

For the space resource, in a high-frequency scenario, a single beam has a relatively narrow width, and the second network device (access network device) needs to send beams in different directions to implement full cell coverage. Therefore, beams in different directions represent space resources.

For the power resource, the access network device or the UE may perform signal transmission by using different powers, so that the UE can use different powers to perform demodulation. A data power and power information of a demodulation pilot are required during data demodulation. Therefore, in processes of sending different beams, the power information may be different.

The M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

Further, when the resource groups in the foregoing are time domain resources, a correspondence between a resource of each resource group and a resource in another resource group may be presented by using an offset. This is described in the following by using a specific embodiment.

If the nth resource in the first resource group is the time domain resource, and the mth resource in the second resource group is the time domain resource, the following formula is met:

$$m = n + x_1;$$

$x_1$ is a first offset, and $x_1$ is greater than or equal to 0;
if the qth resource in the third resource group is the time domain resource, the following formula is met:

$$q = m + x_2;$$

$x_2$ is a second offset, and $x_2$ is greater than or equal to 0;
if the kth resource in the fourth resource group is the time domain resource, the following formula is met:

$$k = q + x_3;$$

$x_3$ is a third offset, and $x_3$ is greater than or equal to 0;
if the jth resource in the fifth resource group is the time domain resource, the following formula is met:

$$j = k + x_4;$$

$x_4$ is a fourth offset, and $x_4$ is greater than or equal to 0;
if the rth resource in the sixth resource group is the time domain resource, the following formula is met:

$$r = j + x_5$$

$x_5$ is a fifth offset, and $x_5$ is greater than or equal to 0;
if the wth resource in the seventh resource group is the time domain resource, the following formula is met:

$$w = r + x_6$$

$x_6$ is a sixth offset, and $x_6$ is greater than or equal to 0;
if the cth resource in the eighth resource group is the time domain resource, the following formula is met:

$$c = w + x_7$$

$x_7$ is a seventh offset, and $x_7$ is greater than or equal to 0; and
if the sth resource in the ninth resource group is the time domain resource, the following formula is met:

$$s = c + x_8$$

$x_8$ is an eighth offset, and $x_8$ is greater than or equal to 0.

Further, the space resource indicates at least one beam that is used when the second network device sends a signal, or at least one beam that is used when the first network device sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

Figures 9, 10:
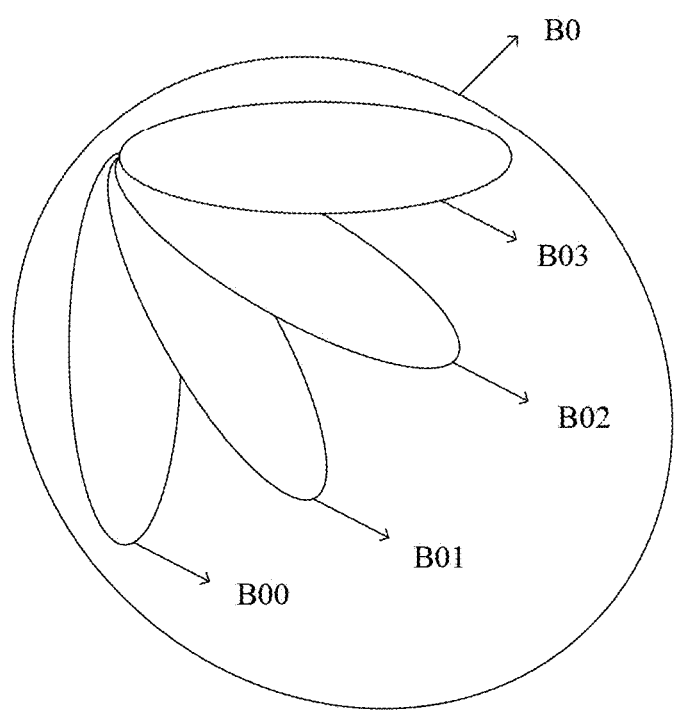
FIG. 9 is a schematic diagram of a space resource according to an embodiment of the present invention.
FIG. 10 is a schematic flowchart of another signal transmission method according to an embodiment of the present invention.

FIG. 9 is a schematic diagram of a space resource according to an embodiment of the present invention. Referring to FIG. 9, a beam with a relatively large range may include specific subbeams. For example, a synchronization channel uses a wide beam Bo that includes four subbeams with a relatively narrow beamwidth: B00, B01, B02, and B03. If UE1 detects the synchronization channel on B00, it may be understood that a second network device sends the synchronization channel on each resource of a second resource group (B00, B01, B02, B03). UE1 detects the synchronization channel on B00, that is, detects the synchronization channel on an mth resource in the second resource group. An identifier of B00 may have a correspondence with a resource of a next second signal, and the correspondence may be a one-to-one correspondence or a one-to-multiple correspondence. That is, UE1 performs detection on B00 on the mth resource in the second resource group and learns that the identifier of B00 has a correspondence with the qth resource in the third resource group. Then, UE1 performs a subsequent operation on the qth resource in the third resource group. Certainly, as described above, the foregoing correspondence may be a one-to-multiple correspondence. That is, the identifier of B00 is corresponding to multiple resources in the third resource group. In this case, the UE may preferably select a resource that is in the third resource group and that meets a requirement of the UE, so as to perform a subsequent operation.

Further, the first correspondence to the seventh correspondence in the foregoing may have multiple implementations, and this is not limited in the present invention. The first correspondence is used as an example for description in the following.

When the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

For example, if a resource in the first resource group is a time domain resource, and a resource in the second resource group is a time domain resource, the first correspondence may be an index established between the first resource group and the second resource group. The index may be a radio frame index, a subframe index, or a symbol index. When the first network device determines the nth resource in the first resource group, the first network device obtains the mth resource in the second resource group according to the resource by using a function relationship, that is, m=f(n); or, for another example, if a resource in the first resource group is a time resource, and a resource in the second resource group is a frequency resource, an index may be established between the first resource group and the second resource group. The index may be a radio frame index, a subframe index, or a symbol index. When the first network device determines the nth resource in the first resource group, the first network device obtains the mth resource in the second resource group according to the resource by using a function relationship, that is, m=f(n).

For different resource groups, regardless of which resource is used, a correspondence between different resource groups can be obtained by using the foregoing index establishment manner.

The second network device is described in the following. FIG. 10 is a schematic flowchart of another signal transmission method according to an embodiment of the present invention. The method is executed by the second network device, and the second network device may be specifically a base station, an eNB, an access network device, a hotspot device, a relay device, or the like. Referring to FIG. 10, the method includes the following step.

Step 200: The second network device sends a first signal in a first resource group, where the first resource group includes N resources, N is a positive integer greater than 1, and each resource of the first resource group is corresponding to one first signal.

An nth resource in the first resource group has a first correspondence with an mth resource in a second resource group, the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N.

According to the signal transmission method provided in this embodiment of the present invention, a second network device sends a first signal in a first resource group. The first resource group includes N resources, N is a positive integer greater than 1, and each resource of the first resource group is corresponding to one first signal. An nth resource in the first resource group has a first correspondence with an mth resource in a second resource group, the second resource group includes M resources, M is a positive integer greater than 1, the mth resource in the second resource group is one of at least two candidate resources in the second resource group, the nth resource in the first resource group has the first correspondence with each of the at least two candidate resources in the second resource group, a value range of m is 0<m≤M, and a value range of n is 0<n≤N. Therefore, full coverage of a signal (such as a synchronization signal, a system message, or a broadcast message) is ensured in an entire cell in a high-frequency scenario. That is, a second network device (access device) sends a first signal to UE in the first resource group. Because the first resource group includes multiple resources, on each resource of one resource group, transmission may be performed for different UE. That is, a resource on which different UE detects a signal is different. That is, the UE may determine a correspondence meeting its requirement from correspondences of multiple different resources, and determines the mth resource in the second resource group according to the nth resource in the first resource group. Therefore, the UE does not need to obtain, by means of blind detection on multiple candidate second resources in the second resource group, a second signal sent by the second network device, or send a signal on multiple resources in the second resource group, thereby improving system efficiency and performance.

By comparison, in the current technology, a beam is relatively narrow in a high-frequency scenario and cannot cover an entire cell. Therefore, a resource on which a base station exchanges a synchronization channel, a measurement pilot signal, a broadcast channel, and the like with UE is always the same for all UE within coverage of the base station. That is, all UE in the entire cell detects a synchronization channel, a measurement pilot signal, a broadcast channel, and the like on a same resource. However, when a massive MIMO technology is used, because a formed beam is extremely narrow, a requirement for covering UE in an entire cell by using a same resource cannot be met.

Figure 11A:
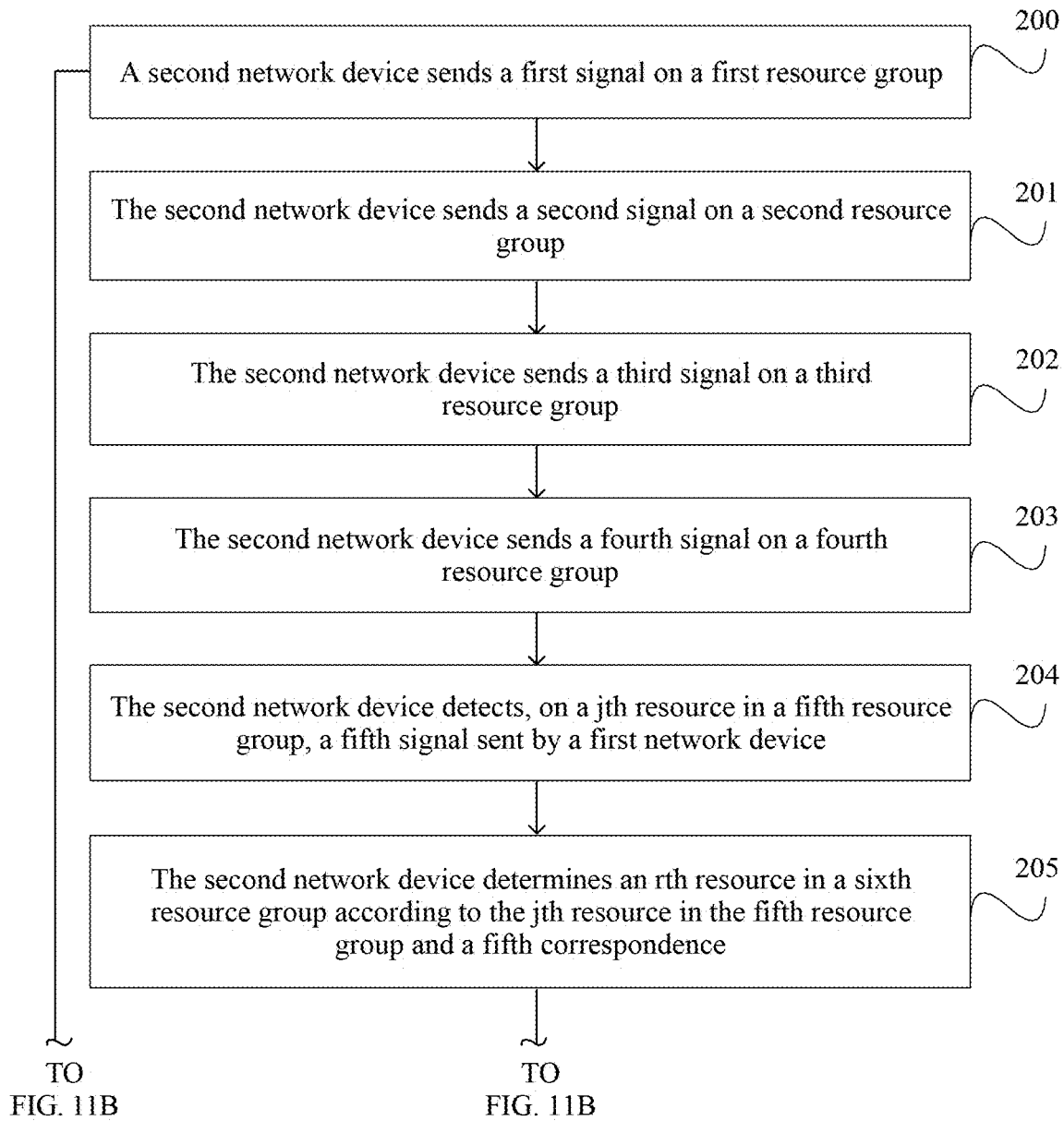
FIG. 11A and FIG. 11B are a schematic flowchart of another signal transmission method according to an embodiment of the present invention.
Figure 11B:
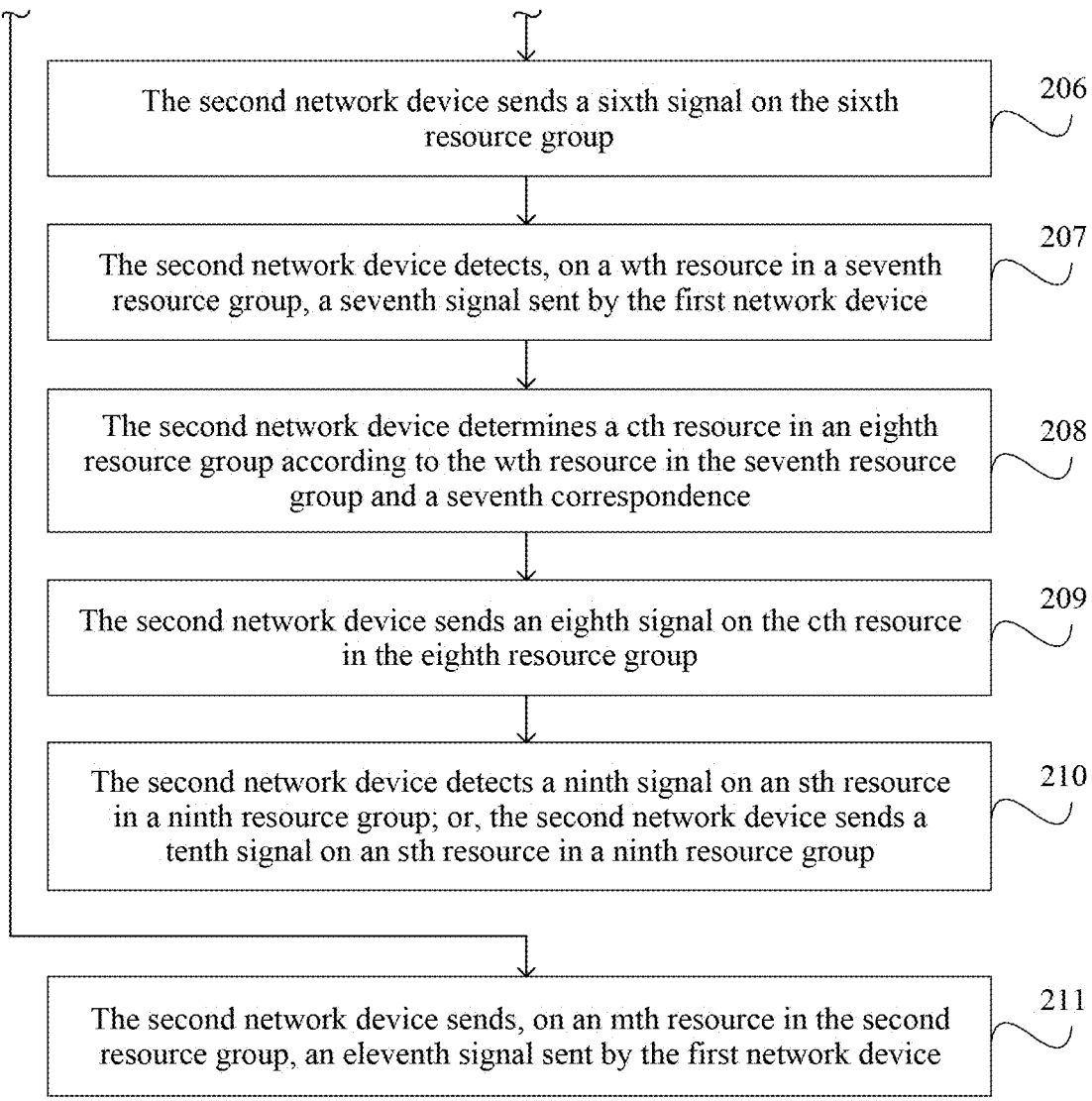

Further, based on FIG. 10, FIG. 11A and FIG. 11B are a schematic flowchart of another signal transmission method according to an embodiment of the present invention. Referring to FIG. 11A and FIG. 11B, after step 200, the method further includes the following steps.

Step 201: The second network device sends a second signal in the second resource group, where each resource of the second resource group is corresponding to one second signal.

The mth resource in the second resource group has a second correspondence with a qth resource in a third resource group, the third resource group includes Q resources, Q is a positive integer greater than 1, the qth resource in the third resource group is one of at least two candidate resources in the third resource group, the mth resource in the second resource group has the second correspondence with each of the at least two candidate resources in the third resource group, and a value range of q is 0<q≤Q.

Optionally, the first signal is at least one of a synchronization channel, a measurement pilot signal, a broadcast channel, a system message, a random access response channel, an RRC request acknowledgment message, or a downlink data channel; where when the first signal is the synchronization channel, the second signal is at least one of the measurement pilot signal, the broadcast channel, the system message, the random access response channel, the RRC request acknowledgment message, or the downlink data channel; when the first signal is the measurement pilot signal, the second signal is at least one of the broadcast channel, the system message, the random access response channel, the RRC request acknowledgment message, or the downlink data channel; when the first signal is the broadcast channel, the second signal is at least one of the system message, the random access response channel, the RRC request acknowledgment message, or the downlink data channel; when the first signal is the system message, the second signal is at least one of the random access response channel, the RRC request acknowledgment message, or the downlink data channel; when the first signal is the random access response channel, the second signal is at least one of the RRC request acknowledgment message or the downlink data channel; or when the first signal is the RRC request acknowledgment message, the second signal is the downlink data channel.

Further referring to FIG. 11A and FIG. 11B, after step 201, the method further includes the following.

Step 202: The second network device sends a third signal on the third resource group, where each resource of the third resource group is corresponding to one third signal.

The qth resource in the third resource group has a third correspondence with a kth resource in a fourth resource group, the fourth resource group includes K resources, K is a positive integer greater than 1, the kth resource in the fourth resource group is one of at least two candidate resources in the fourth resource group, the qth resource in the third resource group has the third correspondence with each of the at least two candidate resources in the fourth resource group, and a value range of k is $0<k\leq K$.

Optionally, the third signal is a broadcast channel.

Further referring to FIG. 11A and FIG. 11B, after step 202, the method further includes:

Step 203: The second network device sends a fourth signal on the fourth resource group, where each resource of the fourth resource group is corresponding to one fourth signal.

The kth resource in the fourth resource group has a fourth correspondence with a jth resource in a fifth resource group, the fifth resource group includes J resources, J is a positive integer greater than 1, the jth resource in the fifth resource group is one of at least two candidate resources in the fifth resource group, the kth resource in the fourth resource group has the fourth correspondence with each of the at least two candidate resources in the fifth resource group, and a value range of j is $0<j\leq J$.

Optionally, the fourth signal is a system message.

Further referring to FIG. 11A and FIG. 11B, after step 203, the method further includes the following.

Step 204: The second network device detects, on the jth resource in the fifth resource group, a fifth signal sent by the first network device, where each resource of the fifth resource group is corresponding to one fifth signal.

Step 205: The second network device determines an rth resource in the sixth resource group according to the jth resource in the fifth resource group and a fifth correspondence, where the sixth resource group includes R resources, R is a positive integer greater than 1, the rth resource in the sixth resource group is one of at least two candidate resources in the sixth resource group, and a value range of r is $0<r\leq R$.

It should be noted that before step 205, the second network device needs to determine the jth resource in the fifth resource group. For a specific implementation, refer to manner 1 to manner 4 in the foregoing.

Optionally, the fifth signal is a random access channel.

Further referring to FIG. 11A and FIG. 11B, after step 205, the method further includes the following.

Step 206: The second network device sends a sixth signal on the sixth resource group, where each resource of the sixth resource group is corresponding to one sixth signal.

The rth resource in the sixth resource group has a sixth correspondence with a wth resource in a seventh resource group, the seventh resource group includes W resources, W is a positive integer greater than 1, the wth resource in the seventh resource group is one of at least two candidate resources in the seventh resource group, the rth resource in the sixth resource group has the sixth correspondence with each of the at least two candidate resources in the seventh resource group, and a value range of w is $0<w\leq W$.

Optionally, the sixth signal is a random access response channel.

Further referring to FIG. 11A and FIG. 11B, after step 206, the method further includes the following.

Step 207: The second network device detects, on the wth resource in the seventh resource group, a seventh signal sent by the first network device, where each resource of the seventh resource group is corresponding to one seventh signal.

Step 208: The second network device determines a cth resource in the eighth resource group according to the wth resource in the seventh resource group and a seventh correspondence, where the eighth resource group includes C resources, C is a positive integer greater than 1, the cth resource in the eighth resource group is one of at least two candidate resources in the eighth resource group, and a value range of c is $0<c\leq C$.

It should be noted that before step 208, the second network device needs to determine the wth resource in the seventh resource group. For a specific implementation, refer to manner 1 to manner 4 in the foregoing.

Optionally, the seventh signal is an RRC request message.

Further referring to FIG. 11A and FIG. 11B, after step 208, the method further includes the following.

Step 209: The second network device sends an eighth signal on the cth resource in the eighth resource group, where each resource of the eighth resource group is corresponding to one eighth signal.

The cth resource in the eighth resource group has an eighth correspondence with an sth resource in a ninth resource group, the ninth resource group includes S resources, S is a positive integer greater than 1, the sth resource in the ninth resource group is one of at least two candidate resources in the ninth resource group, the cth resource in the eighth resource group has the eighth correspondence with each of the at least two candidate resources in the ninth resource group, and a value range of s is $0<s\leq S$.

Optionally, the eighth signal is an RRC request acknowledgment message.

Further referring to FIG. 11A and FIG. 11B, after step 209, the method further includes the following.

Step 210: The second network device detects a ninth signal on the sth resource in the ninth resource group; or, the second network device sends a tenth signal on the sth resource in the ninth resource group.

Each resource of the ninth resource group is corresponding to one tenth signal.

Optionally, the ninth signal is an uplink data channel, and the tenth signal is a downlink data channel.

Further referring to FIG. 11A and FIG. 11B, after step 200, the method further includes the following.

Step 211: The second network device detects, on the mth resource in the second resource group, an eleventh signal sent by the first network device.

Optionally, the first signal is at least one of a system message, a random access response channel, or an RRC request acknowledgment message, where when the first signal is the system message, the second signal is at least one of a random access channel, an RRC request message, or an uplink data channel; when the first signal is the random access response channel, the second signal is at least one of the RRC request message or the uplink data channel; or when the first signal is the RRC request acknowledgment message, the second signal is the uplink data channel.

Optionally, the N resources in the first resource group are any one type of the following resources: a time domain resource, a frequency domain resource, a code resource, a space resource, or a power resource; the M resources in the second resource group are any one type of the following resources: the time domain resource, the frequency domain resource, the code resource, the space resource, or the power resource; the Q resources in the third resource group are any one type of the following resources: the time domain resource, the frequency domain resource, the code resource, the space resource, or the power resource; the K resources in the fourth resource group are any one type of the following resources: the time domain resource, the frequency domain resource, the code resource, the space resource, or the power resource; the J resources in the fifth resource group are any one type of the following resources: the time domain resource, the frequency domain resource, the code resource, the space resource, or the power resource; the R resources in the sixth resource group are any one type of the following resources: the time domain resource, the frequency domain resource, the code resource, the space resource, or the power resource; the W resources in the seventh resource group are any one type of the following resources: the time domain resource, the frequency domain resource, the code resource, the space resource, or the power resource; the C resources in the eighth resource group are any one type of the following resources: the time domain resource, the frequency domain resource, the code resource, the space resource, or the power resource; or the S resources in the ninth resource group are any one type of the following resources: the time domain resource, the frequency domain resource, the code resource, the space resource, or the power resource.

Optionally, if the nth resource in the first resource group is the time domain resource, and the mth resource in the second resource group is the time domain resource, the following formula is met:

$$m = n + x_1;$$

$x_1$ is a first offset, and $x_1$ is greater than or equal to 0;
if the qth resource in the third resource group is the time domain resource, the following formula is met:

$$q = m + x_2;$$

$x_2$ is a second offset, and $x_2$ is greater than or equal to 0;
if the kth resource in the fourth resource group is the time domain resource, the following formula is met:

$$k = q + x_3;$$

$x_3$ is a third offset, and $x_3$ is greater than or equal to 0;
if the jth resource in the fifth resource group is the time domain resource, the following formula is met:

$$j = k + x_4;$$

$x_4$ is a fourth offset, and $x_4$ is greater than or equal to 0;

if the rth resource in the sixth resource group is the time domain resource, the following formula is met:

$$r = j + x_5$$

$x_5$ is a fifth offset, and $x_5$ is greater than or equal to 0;
if the wth resource in the seventh resource group is the time domain resource, the following formula is met:

$$w = r + x_6$$

$x_6$ is a sixth offset, and $x_6$ is greater than or equal to 0;
if the cth resource in the eighth resource group is the time domain resource, the following formula is met:

$$c = w + x_7$$

$x_7$ is a seventh offset, and $x_7$ is greater than or equal to 0; and
if the sth resource in the ninth resource group is the time domain resource, the following formula is met:

$$s = c + x_8$$

$x_8$ is an eighth offset, and $x_8$ is greater than or equal to 0.

Optionally, the code resource includes any one of the following: a signal sending sequence, a spreading code used by a signal, a scrambling code used by a signal, or a mask added during cyclic redundancy code (CRC) processing.

Optionally, the space resource indicates at least one beam that is used when the second network device sends a signal, or at least one beam that is used when the first network device sends a signal; when the nth resource in the first resource group is the space resource, the first correspondence is a correspondence between an identifier of a beam corresponding to the nth resource in the first resource group and the mth resource in the second resource group; when the mth resource in the second resource group is the space resource, the second correspondence is a correspondence between an identifier of a beam corresponding to the mth resource in the second resource group and the qth resource in the third resource group; when the qth resource in the third resource group is the space resource, the third correspondence is a correspondence between an identifier of a beam corresponding to the qth resource in the third resource group and the kth resource in the fourth resource group; when the kth resource in the fourth resource group is the space resource, the fourth correspondence is a correspondence between an identifier of a beam corresponding to the kth resource in the fourth resource group and the jth resource in the fifth resource group; when the jth resource in the fifth resource group is the space resource, the fifth correspondence is a correspondence between an identifier of a beam corresponding to the jth resource in the fifth resource group and the rth resource in the sixth resource group; when the rth resource in the sixth resource group is the space resource, the sixth correspondence is a correspondence between an identifier of a beam corresponding to the rth resource in the sixth resource group and the wth resource in the seventh resource group; when the wth resource in the seventh resource group is the space resource, the seventh correspondence is a correspondence between an identifier of a beam corresponding to the wth resource in the seventh resource group and the cth resource in the eighth resource group; and when the cth resource in the eighth resource group is the space resource, the eighth correspondence is a correspondence between an identifier of a beam corresponding to the cth resource in the eighth resource group and the sth resource in the ninth resource group.

Optionally, when the nth resource in the first resource group is the time domain resource, and the mth resource in the second resource group is the time domain resource; or, the nth resource in the first resource group is the time domain resource, and the mth resource in the second resource group is the frequency domain resource; or, the nth resource in the first resource group is the frequency domain resource, and the mth resource in the second resource group is the time domain resource; or, the nth resource in the first resource group is the frequency domain resource, and the mth resource in the second resource group is the frequency domain resource; or, the nth resource in the first resource group is the code resource, and the mth resource in the second resource group is the code resource; or, the nth resource in the first resource group is the code resource, and the mth resource in the second resource group is the time domain resource; or, the nth resource in the first resource group is the code resource, and the mth resource in the second resource group is the frequency domain resource; or, the nth resource in the first resource group is the frequency domain resource, and the mth resource in the second resource group is the code resource; or, the nth resource in the first resource group is the time domain resource, and the mth resource in the second resource group is the code resource, the first correspondence is a first index established between the nth resource in the first resource group and the mth resource in the second resource group, where the first index is at least one of a radio frame index, a subframe index, or a symbol index; when the mth resource in the second resource group is the time domain resource, and the qth resource in the third resource group is the time domain resource; or, the mth resource in the second resource group is the time domain resource, and the qth resource in the third resource group is the frequency domain resource; or, the mth resource in the second resource group is the frequency domain resource, and the qth resource in the third resource group is the time domain resource; or, the mth resource in the second resource group is the frequency domain resource, and the qth resource in the third resource group is the frequency domain resource; or, the mth resource in the second resource group is the code resource, and the qth resource in the third resource group is the code resource; or, the mth resource in the second resource group is the code resource, and the qth resource in the third resource group is the time domain resource; or, the mth resource in the second resource group is the code resource, and the qth resource in the third resource group is the frequency domain resource; or, the mth resource in the second resource group is the frequency domain resource, and the qth resource in the third resource group is the code resource; or, the mth resource in the second resource group is the time domain resource, and the qth resource in the third resource group is the code resource, the second correspondence is a second index established between the mth resource in the second resource group and the qth resource in the third resource group, where the second index is at least one of a radio frame index, a subframe index, or a symbol index; when the qth resource in the third resource group is the time domain resource, and the kth resource in the fourth resource group is the time domain resource; or, the qth resource in the third resource group is the time domain resource, and the kth resource in the fourth resource group is the frequency domain resource; or, the qth resource in the third resource group is the frequency domain resource, and the kth resource in the fourth resource group is the time domain resource; or, the qth resource in the third resource group is the frequency domain resource, and the kth resource in the fourth resource group is the frequency domain resource; or, the qth resource in the third resource group is the code resource, and the kth resource in the fourth resource group is the code resource; or, the qth resource in the third resource group is the code resource, and the kth resource in the fourth resource group is the time domain resource; or, the qth resource in the third resource group is the code resource, and the kth resource in the fourth resource group is the frequency domain resource; or, the qth resource in the third resource group is the frequency domain resource, and the kth resource in the fourth resource group is the code resource; or, the qth resource in the third resource group is the time domain resource, and the kth resource in the fourth resource group is the code resource, the third correspondence is a third index established between the qth resource in the third resource group and the kth resource in the fourth resource group, where the third index is at least one of a radio frame index, a subframe index, or a symbol index; when the kth resource in the fourth resource group is the time domain resource, and the jth resource in the fifth resource group is the time domain resource; or, the kth resource in the fourth resource group is the time domain resource, and the jth resource in the fifth resource group is the frequency domain resource; or, the kth resource in the fourth resource group is the frequency domain resource, and the jth resource in the fifth resource group is the time domain resource; or, the kth resource in the fourth resource group is the frequency domain resource, and the jth resource in the fifth resource group is the frequency domain resource; or, the kth resource in the fourth resource group is the code resource, and the jth resource in the fifth resource group is the code resource; or, the kth resource in the fourth resource group is the code resource, and the jth resource in the fifth resource group is the time domain resource; or, the kth resource in the fourth resource group is the code resource, and the jth resource in the fifth resource group is the frequency domain resource; or, the kth resource in the fourth resource group is the frequency domain resource, and the jth resource in the fifth resource group is the code resource; or, the kth resource in the fourth resource group is the time domain resource, and the jth resource in the fifth resource group is the code resource, the fourth correspondence is a fourth index established between the kth resource in the fourth resource group and the jth resource in the fifth resource group, where the fourth index is at least one of a radio frame index, a subframe index, or a symbol index; when the jth resource in the fifth resource group is the time domain resource, and the rth resource in the sixth resource group is the time domain resource; or, the jth resource in the fifth resource group is the time domain resource, and the rth resource in the sixth resource group is the frequency domain resource; or, the jth resource in the fifth resource group is the frequency domain resource, and the rth resource in the sixth resource group is the time domain resource; or, the jth resource in the fifth resource group is the frequency domain resource, and the rth resource in the sixth resource group is the frequency domain resource; or, the jth resource in the fifth resource group is the code resource, and the rth resource in the sixth resource group is the code resource; or, the jth resource in the fifth resource group is the code resource, and the rth resource in the sixth resource group is the time domain resource; or, the jth resource in the fifth resource group is the code resource, and the rth resource in the sixth resource group is the frequency domain resource; or, the jth resource in the fifth resource group is the frequency domain resource, and the rth resource in the sixth resource group is the code resource; or, the jth resource in the fifth resource group is the time domain resource, and the rth resource in the sixth resource group is the code resource, the fifth correspondence is a fifth index established between the jth resource in the fifth resource group and the rth resource in the sixth resource group, where the fifth index is at least one of a radio frame index, a subframe index, or a symbol index; when the rth resource in the sixth resource group is the time domain resource, and the wth resource in the seventh resource group is the time domain resource; or, the rth resource in the sixth resource group is the time domain resource, and the wth resource in the seventh resource group is the frequency domain resource; or, the rth resource in the sixth resource group is the frequency domain resource, and the wth resource in the seventh resource group is the time domain resource; or, the rth resource in the sixth resource group is the frequency domain resource, and the wth resource in the seventh resource group is the frequency domain resource; or, the rth resource in the sixth resource group is the code resource, and the wth resource in the seventh resource group is the code resource; or, the rth resource in the sixth resource group is the code resource, and the wth resource in the seventh resource group is the time domain resource; or, the rth resource in the sixth resource group is the code resource, and the wth resource in the seventh resource group is the frequency domain resource; or, the rth resource in the sixth resource group is the frequency domain resource, and the wth resource in the seventh resource group is the code resource; or, the rth resource in the sixth resource group is the time domain resource, and the wth resource in the seventh resource group is the code resource, the sixth correspondence is a sixth index established between the rth resource in the sixth resource group and the wth resource in the seventh resource group, where the sixth index is at least one of a radio frame index, a subframe index, or a symbol index; when the wth resource in the seventh resource group is the time domain resource, and the cth resource in the eighth resource group is the time domain resource; or, the wth resource in the seventh resource group is the time domain resource, and the cth resource in the eighth resource group is the frequency domain resource; or, the wth resource in the seventh resource group is the frequency domain resource, and the cth resource in the eighth resource group is the time domain resource; or, the wth resource in the seventh resource group is the frequency domain resource, and the cth resource in the eighth resource group is the frequency domain resource; or, the wth resource in the seventh resource group is the code resource, and the cth resource in the eighth resource group is the code resource; or, the wth resource in the seventh resource group is the code resource, and the cth resource in the eighth resource group is the time domain resource; or, the wth resource in the seventh resource group is the code resource, and the cth resource in the eighth resource group is the frequency domain resource; or, the wth resource in the seventh resource group is the frequency domain resource, and the cth resource in the eighth resource group is the code resource; or, the wth resource in the seventh resource group is the time domain resource, and the cth resource in the eighth resource group is the code resource, the seventh correspondence is a seventh index established between the wth resource in the seventh resource group and the cth resource in the eighth resource group, where the seventh index is at least one of a radio frame index, a subframe index, or a symbol index; and when the cth resource in the eighth resource group is the time domain resource, and the sth resource in the ninth resource group is the time domain resource; or, the cth resource in the eighth resource group is the time domain resource, and the sth resource in the ninth resource group is the frequency domain resource; or, the cth resource in the eighth resource group is the frequency domain resource, and the sth resource in the ninth resource group is the time domain resource; or, the cth resource in the eighth resource group is the frequency domain resource, and the sth resource in the ninth resource group is the frequency domain resource; or, the cth resource in the eighth resource group is the code resource, and the sth resource in the ninth resource group is the code resource; or, the cth resource in the eighth resource group is the code resource, and the sth resource in the ninth resource group is the time domain resource; or, the cth resource in the eighth resource group is the code resource, and the sth resource in the ninth resource group is the frequency domain resource; or, the cth resource in the eighth resource group is the frequency domain resource, and the sth resource in the ninth resource group is the code resource; or, the cth resource in the eighth resource group is the time domain resource, and the sth resource in the ninth resource group is the code resource, the eighth correspondence is an eighth index established between the cth resource in the eighth resource group and the sth resource in the ninth resource group, where the eighth index is at least one of a radio frame index, a subframe index, or a symbol index.

A solution of the embodiments of the present invention is described with reference to interaction between a first network device and a second network device.

Figure 12:
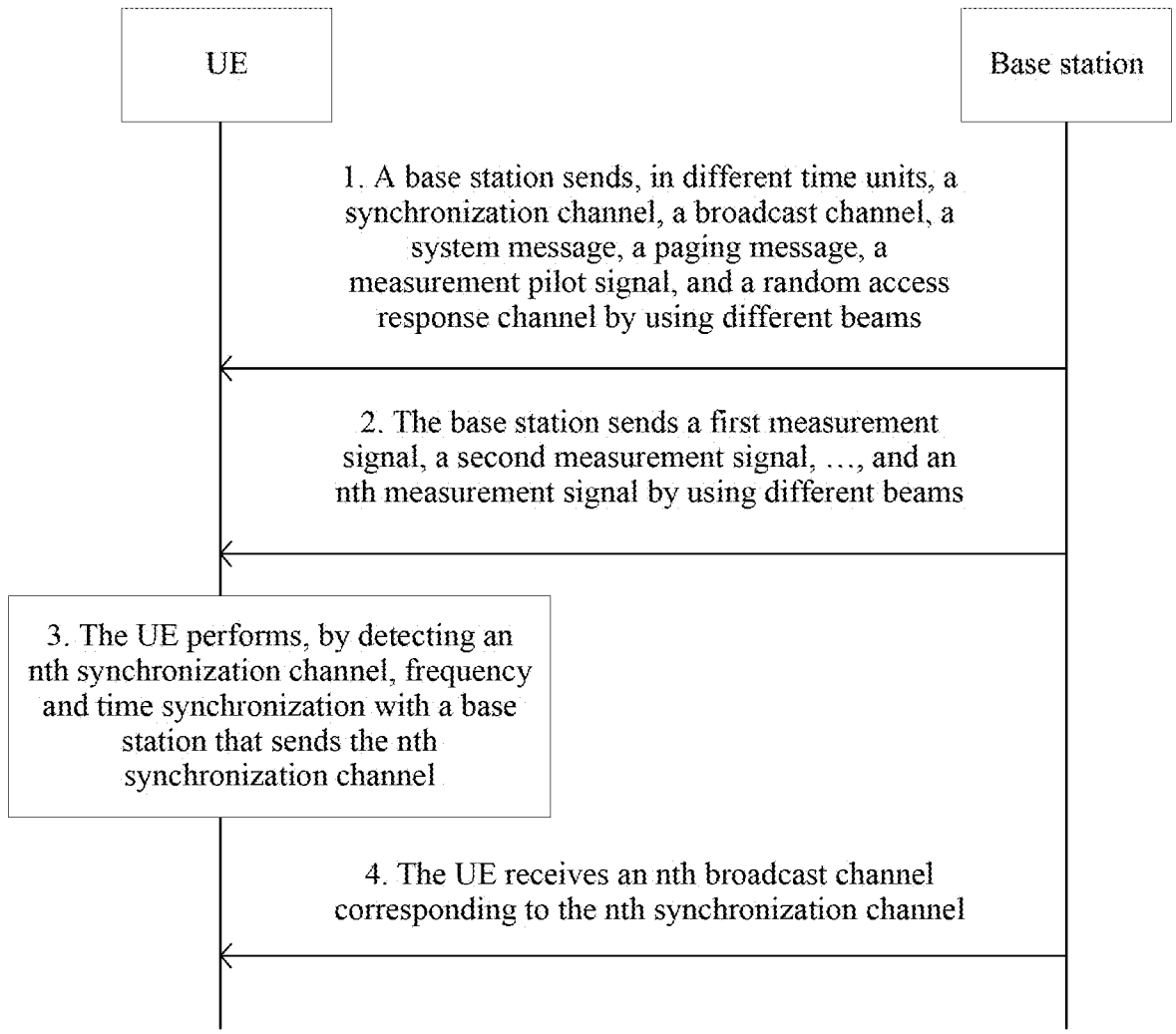
FIG. 12 is a schematic diagram of an interaction process of a signal transmission method according to an embodiment of the present invention.

FIG. 12 is a schematic diagram of an interaction process of a signal transmission method according to an embodiment of the present invention. For example, a first network device is UE, and a second network device is a base station. Referring to FIG. 12, the method includes the following steps.

Step 1: The base station sends a synchronization channel, a broadcast channel, a system message, a paging message, a measurement pilot signal, and a random access response channel in different time units by using different beams.

Figure 13:
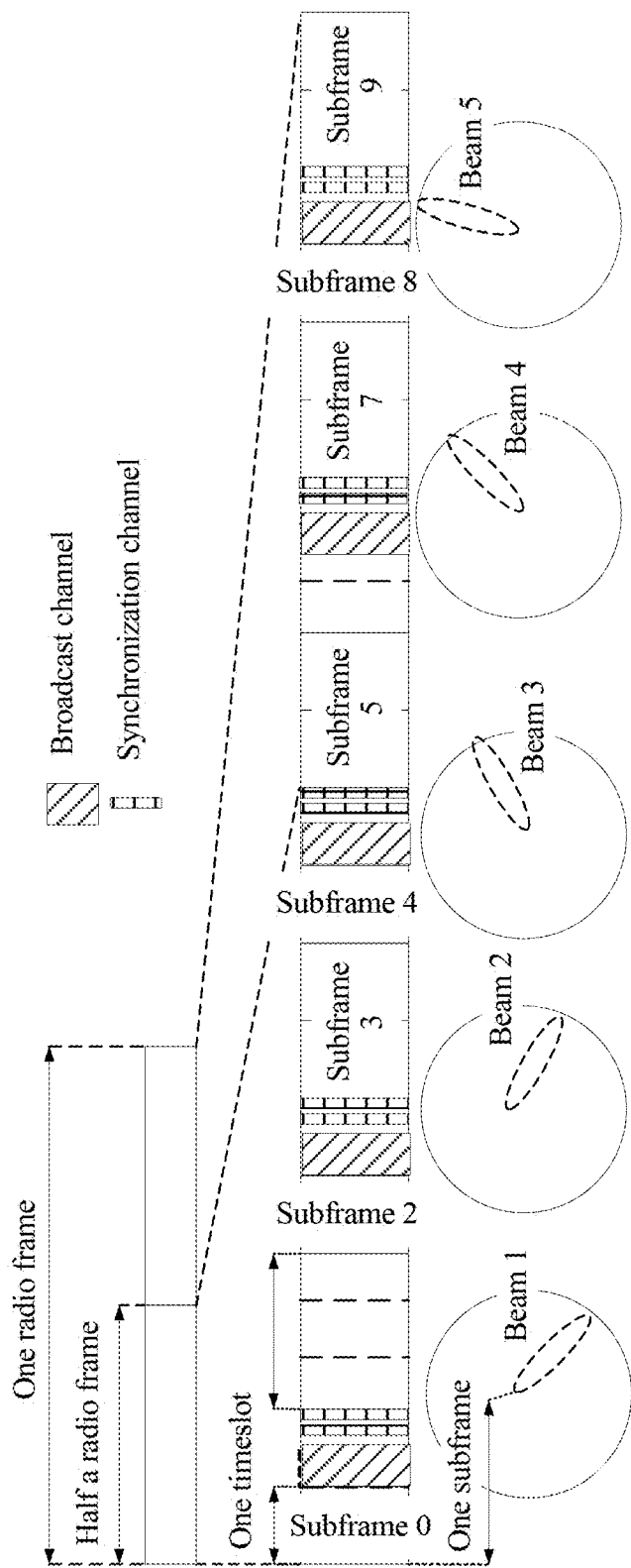
FIG. 13 is a schematic diagram of step 1 in FIG. 12 according to an embodiment of the present invention.

Specifically, FIG. 13 is a schematic diagram of step 1 in FIG. 12 according to an embodiment of the present invention. Referring to FIG. 13, the time unit is the foregoing time domain resource. It is assumed that the time unit is a subframe; the base station sends a first synchronization channel, a first broadcast channel, and a first system message in a first time unit (subframe 0) by using a beam 1; the base station sends a second synchronization channel, a second broadcast channel, and a second system message in a second time unit (subframe 2) by using a beam 2; by analogy, the base station sends an nth synchronization channel, an nth broadcast channel, and an nth system message in an nth time unit (subframe 2n) by using an nth beam.

Optionally, the first synchronization channel and the second synchronization channel may use different sequences. For example, the first synchronization channel uses a sequence S1, and the second synchronization channel uses a sequence S2. That is, the first synchronization channel may use a different code resource or code resource from that used by a synchronization channel on another time domain resource.

It should be noted that the first time unit may be further a radio frame, a timeslot, a symbol, or the like.

Step 2: The base station sends a first measurement signal, a second measurement signal, . . . , and an nth measurement signal by using different beams.

Figure 14:
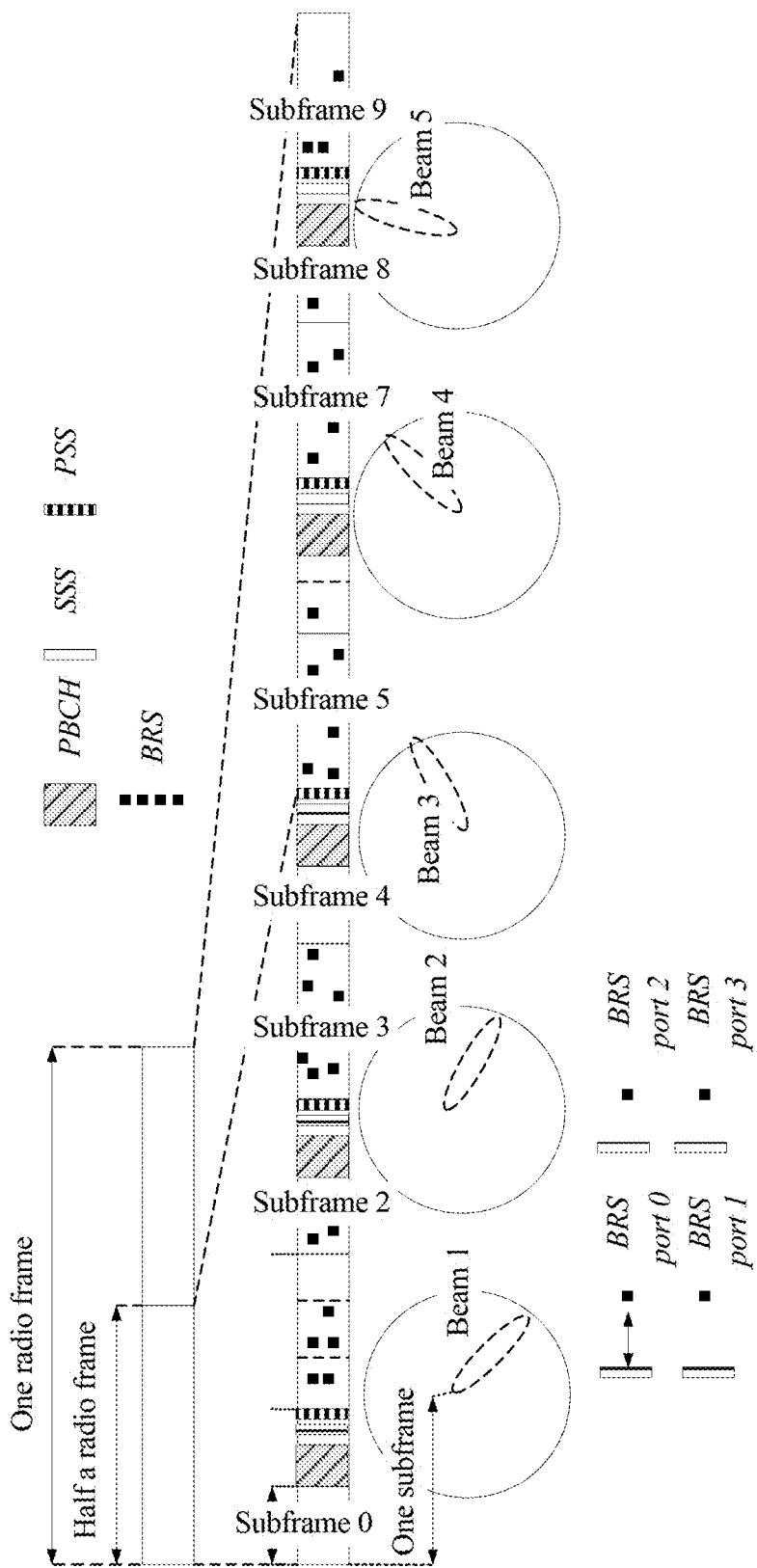
FIG. 14 is a schematic diagram of step 2 in FIG. 12 according to an embodiment of the present invention.

Specifically, FIG. 14 is a schematic diagram of step 2 in FIG. 12 according to an embodiment of the present invention. Referring to FIG. 14, a sequence, a time-frequency location, a pattern, power information, and the like of the nth measurement signal have a correspondence with those of the nth synchronization channel in step 1. The correspondence may be related to a time-frequency resource location of the nth synchronization channel or a sequence of the nth synchronization channel. In addition, the nth measurement signal may use a beam same as that used by the nth synchronization channel.

Step 3: The UE performs, by detecting an nth synchronization channel, frequency and time synchronization with a base station that sends the nth synchronization channel.

Specifically, the detection process may be of a sliding correlation. Further, the base station sends a synchronization channel on multiple first resources, for example, sends n synchronization channels on n first resources. The UE can obtain information (the sequence, the time-frequency location, the pattern, and the power information) of the nth measurement signal by detecting the nth synchronization channel. In addition, the information of the nth measurement signal is used to instruct the UE to detect the nth measurement signal on an nth second resource. Further, the UE detects the nth measurement signal on the nth second resource and measures a reference signal received power (RSRP for short), a received signal strength indicator (RSSI for short), and other information of the nth measurement signal, so as to implement cell selection.

Further, cell selection performed by the UE is described as follows: For example, sequences corresponding to N synchronization channels corresponding to cell 1 are respectively S11, S12, S1n, ..., and S1N that are respectively in a first time unit, a second time unit, an nth time unit, ..., and an Nth time unit.

Figure 15:
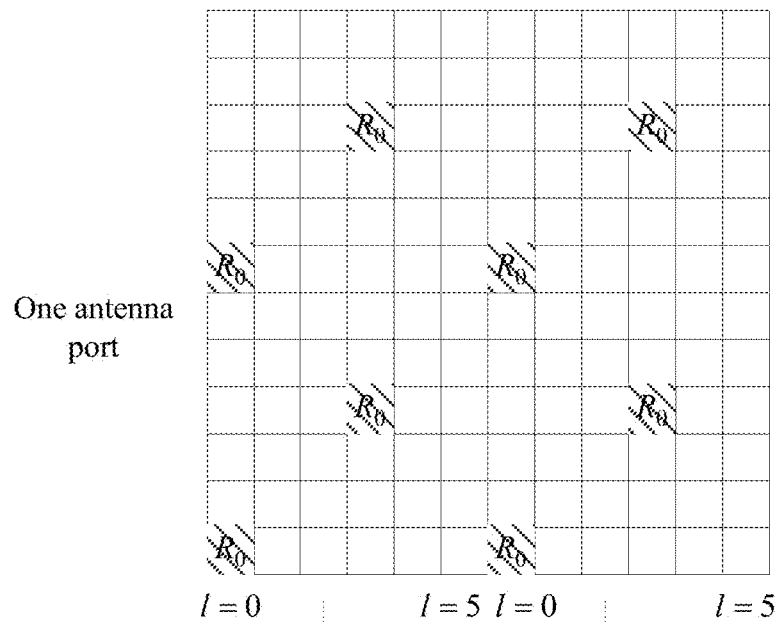
FIG. 15 is a schematic diagram of a pattern according to an embodiment of the present invention.

For example, UE1 finds an nth synchronization channel of cell 1 by means of searching, and determines information such as a pattern and a power of a corresponding nth measurement signal according to a sequence S1n corresponding to the synchronization channel. FIG. 15 is a schematic diagram of a pattern according to an embodiment of the present invention. Referring to FIG. 15, FIG. 15 shows a pattern of a physical resource block pair, a power is P1n, and a received RSRP is RSRP1n.

Further, sequences corresponding to N synchronization channels corresponding to cell 2 are respectively S21, S22, S2n, S1m, ..., and S2N that are respectively in a first time unit, a second time unit, an nth time unit, an mth time unit, ..., and an Nth time unit.

Figure 16:
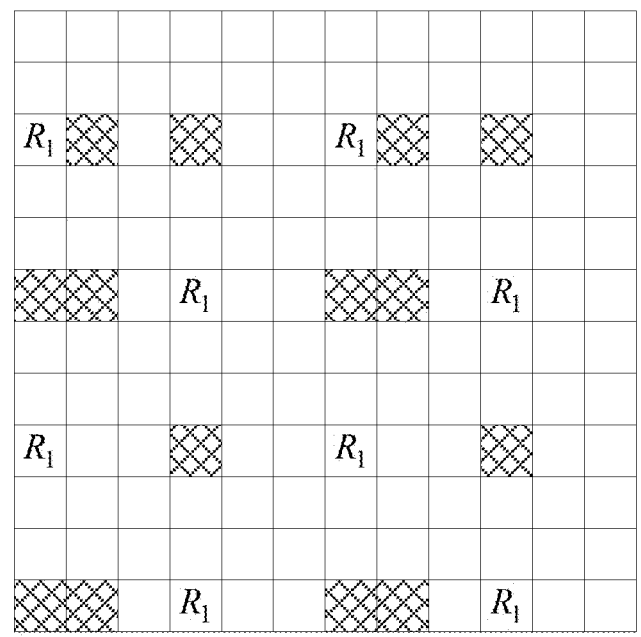
FIG. 16 is a schematic diagram of another pattern according to an embodiment of the present invention.

UE1 finds an mth synchronization channel of cell 2 by means of searching, and can determine information such as a pattern and a power of an mth measurement signal corresponding to the mth synchronization channel according to S1m. FIG. 16 is a schematic diagram of another pattern according to an embodiment of the present invention. Referring to FIG. 16, the power is P1m, and a received RSRP is RSRP2m.

In the foregoing manner, UE1 obtains measurement signals of N cells and compares the measurement signals of the N cells. Each cell has at least two measurement signals, and UE measures only one of the signals. For example, N=2. A base station of cell 1 sends N synchronization signals. Because UE1 detects an nth synchronization signal, an nth measurement signal corresponding to the nth synchronization signal is measured, and RSRP1n is obtained. A base station of cell 2 sends M synchronization signals. Because an mth synchronization signal is detected, an mth measurement signal corresponding to the mth synchronization signal is measured, and RSRP2m is obtained.

UE1 compares RSRP1n with RSRP2m. If RSRP1n>RSRP2m, UE1 selects cell 1; otherwise, selects cell 2.

Step 4: The UE receives an nth broadcast channel corresponding to the nth synchronization channel, where a time-frequency resource of the nth broadcast channel has a correspondence with the nth synchronization channel.

Specifically, the foregoing UE1 is used as an example. It is assumed that UE1 selects cell 1, and implements synchronization with cell 1 based on the nth synchronization channel. Then, the base station of cell 1 notifies, by using the nth broadcast channel, the UE of a sequence, a time-frequency resource, power information, and the like that are used for random access. For example, the base station of cell 1 notifies, by using the nth broadcast channel, the UE that a sequence group used for random access is a sequence group n, a sequence included in the sequence group n is (Pn1, Pn2, Png, ..., PnG), and a time-frequency resource for sending a random access preamble is (tn, fn), where t is a time domain resource, and f is a frequency domain resource. For example, the base station of cell 1 notifies, by using an mth broadcast channel, UE1 of a sequence group m used for random access, a sequence included in the sequence group m is (Pm1, Pm2, Pmg, ..., and PmG), and a time-frequency resource for sending a random access preamble is (tm, fm), where t is a time resource, and f is a frequency resource. That is, content on N broadcast channels sent in one radio frame in one cell may be different; or, sending sequence information of UE does not need to be notified by using a broadcast channel. $(t_n, f_n)$ and $(P_{n1}, P_{n2}, P_{ng}, \ldots, P_{nG})$ are bound to a downlink synchronization signal $S_{1n}$. $(t_m, f_m)$ and $(P_{m1}, P_{m2}, P_{mg}, \ldots, P_{mG})$ are bound to a downlink synchronization signal $S_{1m}$.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal transmission method, comprising:
   detecting, in a first resource group, a first signal, wherein the first resource group comprises N resources, N is a positive integer greater than 1, and each resource of the first resource group corresponds to one respective first signal;
   determining an nth resource in the first resource group according to a first rule, wherein determining the nth resource in the first resource group according to the first rule comprises using a resource in the first resource group on which energy of the first signal is greater than a first preset threshold as the nth resource in the first resource group;
   determining an mth resource in a second resource group according to the nth resource in the first resource group and a first correspondence, wherein the nth resource in the first resource group has the first correspondence with the mth resource in the second resource group, the second resource group comprises M resources, M is a positive integer greater than 1, a value range of m is 0<m≤M, and a value range of n is 0<n≤N; and detecting, on the mth resource in the second resource group, a second signal, wherein each resource of the second resource group corresponds to one respective second signal, and wherein the first signal comprises at least one of a synchronization channel, a broadcast channel, or a measurement pilot signal, and the second signal is a random access response channel or a system message.

2. The method according to claim 1, wherein a type of the nth resource in the first resource group and a type of the mth resource in the second resource group are as follows:

the nth resource in the first resource group is a time domain resource, and the mth resource in the second resource group is a time domain resource; or the nth resource in the first resource group is the time domain resource, and the mth resource in the second resource group is a frequency domain resource; or the nth resource in the first resource group is the frequency domain resource, and the mth resource in the second resource group is the time domain resource; or the nth resource in the first resource group is the frequency domain resource, and the mth resource in the second resource group is the frequency domain resource; or the nth resource in the first resource group is a code resource, and the mth resource in the second resource group is the code resource; or the nth resource in the first resource group is the code resource, and the mth resource in the second resource group is the time domain resource; or the nth resource in the first resource group is the code resource, and the mth resource in the second resource group is the frequency domain resource; or the nth resource in the first resource group is the frequency domain resource, and the mth resource in the second resource group is the code resource; or the nth resource in the first resource group is the time domain resource, and the mth resource in the second resource group is the code resource.

3. The method according to claim 1, further comprising:
sending a random access signal, wherein the random access response channel is received in response to the sending of the random access signal.

4. The method according to claim 1, wherein the first signal and the second signal are received on a same beam.

5. The method according to claim 1, wherein the first signal and the second signal are received on associated beams.

6. The method according to claim 1, wherein a type of the nth resource in the first resource group is a space resource type and a type of the mth resource in the second resource group is a space resource type.

7. A signal transmission method, comprising:
sending, in a first resource group, a first signal to a user equipment (UE), wherein the first resource group comprises N resources, N is a positive integer greater than 1, and each resource of the first resource group corresponds to one respective first signal;

detecting a random access request on a resource corresponding to a nth resource in the first resource group; and sending, on a mth resource in a second resource group, a second signal to the UE, wherein the mth resource has a first correspondence with the nth resource, the second resource group comprises M candidate resources, M is a positive integer greater than 1, a value range of m is 0<m≤M, a value range of n is 0<n≤N, and each resource of the second resource group corresponds to one respective second signal, and wherein the first signal comprises at least one of a synchronization channel, a broadcast channel, or a measurement pilot signal, and the second signal is a random access response channel or a system message.

8. The method according to claim 7, wherein a type of the nth resource in the first resource group and a type of the mth resource in the second resource group are as follows:

the nth resource in the first resource group is a time domain resource, and the mth resource in the second resource group is a time domain resource; or the nth resource in the first resource group is the time domain resource, and the mth resource in the second resource group is a frequency domain resource; or the nth resource in the first resource group is the frequency domain resource, and the mth resource in the second resource group is the time domain resource; or the nth resource in the first resource group is the frequency domain resource, and the mth resource in the second resource group is the frequency domain resource; or the nth resource in the first resource group is a code resource, and the mth resource in the second resource group is the code resource; or the nth resource in the first resource group is the code resource, and the mth resource in the second resource group is the time domain resource; or the nth resource in the first resource group is the code resource, and the mth resource in the second resource group is the frequency domain resource; or the nth resource in the first resource group is the frequency domain resource, and the mth resource in the second resource group is the code resource; or the nth resource in the first resource group is the time domain resource, and the mth resource in the second resource group is the code resource.

9. The method according to claim 7, wherein the first signal and the second signal are sent on a same beam.

10. The method according to claim 7, wherein the first signal and the second signal are sent on associated beams.

11. The method according to claim 7, wherein a type of the nth resource in the first resource group is a space resource type and a type of the mth resource in the second resource group is a space resource type.

12. A device, comprising:
a processor; and
a non-transitory computer-readable storage medium including computer-executable instructions executable by the processor, the instructions including instructions to:

detect, in a first resource group, a first signal, wherein the first resource group comprises N resources, N is a positive integer greater than 1, and each resource of the first resource group corresponds to one respective first signal;

determine an nth resource in the first resource group according to a first rule, wherein determining the nth resource in the first resource group according to the first rule comprises using a resource on which energy of the first signal is greater than a first preset threshold in the first resource group as the nth resource in the first resource group;

determine an mth resource in a second resource group according to the nth resource in the first resource group and a first correspondence, wherein the nth resource in the first resource group has the first correspondence with the mth resource in the second resource group, the second resource group comprises M resources, M is a positive integer greater than 1, a value range of m is 0<m≤M, and a value range of n is 0<n≤N; and detect, on the mth resource in the second resource group, a second signal, wherein each resource of the second resource group corresponds to one respective second signal, and wherein the first signal comprises at least one of a synchronization channel, a broadcast channel, or a measurement pilot signal, and the second signal is a random access response channel or a system message.

13. The device according to claim 12, wherein a type of the nth resource in the first resource group and a type of the mth resource in the second resource group are as follows:
the nth resource in the first resource group is a time domain resource, and the mth resource in the second resource group is a time domain resource; or
the nth resource in the first resource group is the time domain resource, and the mth resource in the second resource group is a frequency domain resource; or
the nth resource in the first resource group is the frequency domain resource, and the mth resource in the second resource group is the time domain resource; or
the nth resource in the first resource group is the frequency domain resource, and the mth resource in the second resource group is the frequency domain resource; or
the nth resource in the first resource group is a code resource, and the mth resource in the second resource group is the code resource; or
the nth resource in the first resource group is the code resource, and the mth resource in the second resource group is the time domain resource; or
the nth resource in the first resource group is the code resource, and the mth resource in the second resource group is the frequency domain resource; or
the nth resource in the first resource group is the frequency domain resource, and the mth resource in the second resource group is the code resource; or
the nth resource in the first resource group is the time domain resource, and the mth resource in the second resource group is the code resource.

14. The device according to claim 12, wherein the instructions further include instructions to:
send a random access signal, wherein the random access response channel is received in response to the sending of the random access signal.

15. The device according to claim 12, wherein the first signal and the second signal are received on a same beam.

16. The device according to claim 12, wherein the first signal and the second signal are received on associated beams.

17. The device according to claim 12, wherein a type of the nth resource in the first resource group is a space resource type and a type of the mth resource in the second resource group is a space resource type.

18. A device, comprising:
a processor; and
a non-transitory computer-readable storage medium including computer-executable instructions executed by the processor to:

send, in a first resource group, a first signal to a user equipment (UE), wherein the first resource group comprises N resources, N is a positive integer greater than 1, and each resource of the first resource group corresponds to one respective first signal;

detect a random access request on a resource corresponding to a nth resource in the first resource group; and send, on a mth resource in a second resource group, a second signal to the UE, wherein the mth resource has a first correspondence with the nth resource, the second resource group comprises M candidate resources, M is a positive integer greater than 1, a value range of m is 0<m≤M, a value range of n is 0<n≤N and each resource of the second resource group corresponds to one respective second signal, and wherein the first signal comprises at least one of a synchronization channel, a broadcast channel or a measurement pilot signal, and the second signal is a random access response channel or a system message.

19. The device according to claim 18, wherein a type of the nth resource in the first resource group and a type of the mth resource in the second resource group are as follows:
the nth resource in the first resource group is a time domain resource, and the mth resource in the second resource group is a time domain resource; or
the nth resource in the first resource group is the time domain resource, and the mth resource in the second resource group is a frequency domain resource; or
the nth resource in the first resource group is the frequency domain resource, and the mth resource in the second resource group is the time domain resource; or
the nth resource in the first resource group is the frequency domain resource, and the mth resource in the second resource group is the frequency domain resource; or
the nth resource in the first resource group is a code resource, and the mth resource in the second resource group is the code resource; or
the nth resource in the first resource group is the code resource, and the mth resource in the second resource group is the time domain resource; or
the nth resource in the first resource group is the code resource, and the mth resource in the second resource group is the frequency domain resource; or
the nth resource in the first resource group is the frequency domain resource, and the mth resource in the second resource group is the code resource; or
the nth resource in the first resource group is the time domain resource, and the mth resource in the second resource group is the code resource.

20. The device according to claim 18, wherein the first signal and the second signal are sent on a same beam.

21. The device according to claim 18, wherein the first signal and the second signal are sent on associated beams.

22. The device according to claim 18, wherein a type of the nth resource in the first resource group is a space resource type and a type of the mth resource in the second resource group is a space resource type.

23. A non-transitory computer-readable storage medium comprising instructions which, when executed by a computer, cause the computer to:
detect, in a first resource group, a first signal, wherein the first resource group comprises N resources, N is a positive integer greater than 1, and each resource of the first resource group corresponds to one respective first signal;

determine an nth resource in the first resource group according to a first rule, wherein determining the nth resource in the first resource group according to the first rule comprises using a resource on which energy of the first signal is greater than a first preset threshold in the first resource group as the nth resource in the first resource group;

determine an mth resource in a second resource group according to the nth resource in the first resource group and a first correspondence, wherein the nth resource in the first resource group has the first correspondence with the mth resource in the second resource group, the second resource group comprises M resources, M is a positive integer greater than 1, a value range of m is 0<m≤M, and a value range of n is 0<n≤N; and detect, on the mth resource in the second resource group, a second signal, wherein each resource of the second resource group corresponds to one respective second signal, and wherein the first signal comprises at least one of a synchronization channel, a broadcast channel, or a measurement pilot signal, and the second signal is a random access response channel or a system message.

24. A non-transitory computer-readable storage medium comprising instructions which, when executed by a computer, cause the computer to:

send in a first resource group, a first signal to a user equipment (UE), wherein the first resource group comprises N resources, N is a positive integer greater than 1, and each resource of the first resource group corresponds to one respective first signal;

detect a random access request on a resource corresponding to a nth resource in the first resource group; and send, on a mth resource in a second resource group, a second signal to the UE, wherein the mth resource has a first correspondence with the nth resource, the second resource group comprises M candidate resources, M is a positive integer greater than 1, a value range of m is 0<m≤M, a value range of n is 0<n≤N, and each resource of the second resource group corresponds to one respective second signal, and wherein the first signal comprises at least one of a synchronization channel, a broadcast channel, or a measurement pilot signal, and the second signal is a random access response channel or a system message.

* * * * *